US012771552B2

(12) United States Patent
Gomes et al.

(10) Patent No.: US 12,771,552 B2
(45) Date of Patent: Oct. 20, 2026

(54) PROCESSOR ACTIVITY INSTRUMENTATION PROCESSING FOR CRYPTOGRAPHIC INSTRUCTIONS

(71) Applicant: INTERNATIONAL BUSINESS MACHINES CORPORATION, Armonk, NY (US)

(72) Inventors: Louis P. Gomes, Poughkeepsie, NY (US); Bruce Conrad Giamei, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 18/756,496

(22) Filed: Jun. 27, 2024

(65) Prior Publication Data

US 2026/0005868 A1 Jan. 1, 2026

(51) Int. Cl.
*H04L 9/32* (2006.01)
*H04L 9/00* (2022.01)

(52) U.S. Cl.
CPC .............. *H04L 9/3242* (2013.01); *H04L 9/50* (2022.05)

(58) Field of Classification Search
CPC ................................ H04L 9/3242; H04L 9/50
See application file for complete search history.

(56) References Cited

U.S. PATENT DOCUMENTS 8,732,480 B2 5/2014 Hashimoto et al.
10,313,129 B2 * 6/2019 Gopal ................. G06F 9/30007
11,188,326 B2 11/2021 Greiner et al.
2009/0182988 A1 * 7/2009 Greiner ............... G06F 9/30021 712/216
2010/0031052 A1 * 2/2010 Kim ...................... H04L 63/164 713/181
2011/0302418 A1 12/2011 Fujisaki
2020/0057664 A1 * 2/2020 Durham .................. G06F 21/53
2020/0142705 A1 * 5/2020 Giamei ............... G06F 9/30021
(Continued)

OTHER PUBLICATIONS

International Searching Authority, “Notification of Transmittal of the International Search Report and the Written Opinion of the International Searching Authority, or Declaration,” Patent Cooperation Treaty, Aug. 27, 2025, 15 pages, International Application No. PCT/EP2025/065127.

(Continued)

*Primary Examiner* — Blake I Narramore
(74) *Attorney, Agent, or Firm* — Edward J. Wixted, III, Esq.; Blanche E. Schiller, Esq.; Heslin Rothenberg Farley & Mesiti P.C.

(57) ABSTRACT

An instruction to perform cryptographic processing is executed. Executing the instruction includes performing a plurality of operations to generate a cryptographic result. Based on performing at least multiple operations of the plurality of operations, an access exception condition for a storage location used by an instrumentation counter is detected. Based on detecting the access exception condition, execution of the instruction is interrupted. The instruction is re-executed to obtain access to the instrumentation counter. The re-executing the instruction starts from where execution was interrupted and includes updating the instrumentation counter, based on the storage location used for the instrumentation counter being validated.

25 Claims, 14 Drawing Sheets

(56) References Cited

U.S. PATENT DOCUMENTS

| | | | | |
|---|---|---|---|---|
| 2020/0267542 | A1* | 8/2020 | Pronk | H04W 12/037 |
| 2021/0218547 | A1* | 7/2021 | Weiler | G06F 12/121 |
| 2023/0027329 | A1* | 1/2023 | Durham | G06F 12/1466 |

OTHER PUBLICATIONS

Richter, Thomas, "[Patch 0/2] s390/pai: Add Support for Processor Activity Instrumentation," May 4, 2022, Linux-kernel patch; and ["Patch 2/2] s390/pai: Add Support for Cryptography Counters," May 4, 2022, https://lore.kernel.org/lkml/87fslmfhqx.ffs@tglx/T/, pp. 1-24.
IBM, "z/Architecture Principles of Operation," IBM Publication No. SA22-7832-13, Fourteenth Edition, May 2022, pp. 1-2124.
U.S. Department of Commerce, FIPS PUB 198-1—The Keyed-Hash Message Authentication Code (HMAC), Jul. 2008, 13 pages.
Juliato, Marcio et al., "Tailoring a Reconfigurable Platform to SHA-256 and HMAC through Custom Instructions and Peripherals," 2009 International Conference on Reconfigurable Computing and FPGAs, Jan. 2009, pp. 195-200.
Mol, Naisy S. et al., "Design of an HMAC Co-Processor Unit Based on SHA-2 Family of Hash Functions," International Journal of Engineering Research & Technology, vol. 3, Issue 3, Mar. 2014, pp. 684-690.
Michail, H.E. et al., "Efficient Implementation of the Keyed-Hash Message Authentication Code (MHAC) Using the SHA-1 Hash Function," May 2004, pp. 567-570.
Heinrich, Enrico et al., "FPGA-Based Implementation Alternatives for Keyed-Hash Message Authentication Code in Networked Embedded Systems," Sep. 2009, pp. 1-5.

* cited by examiner

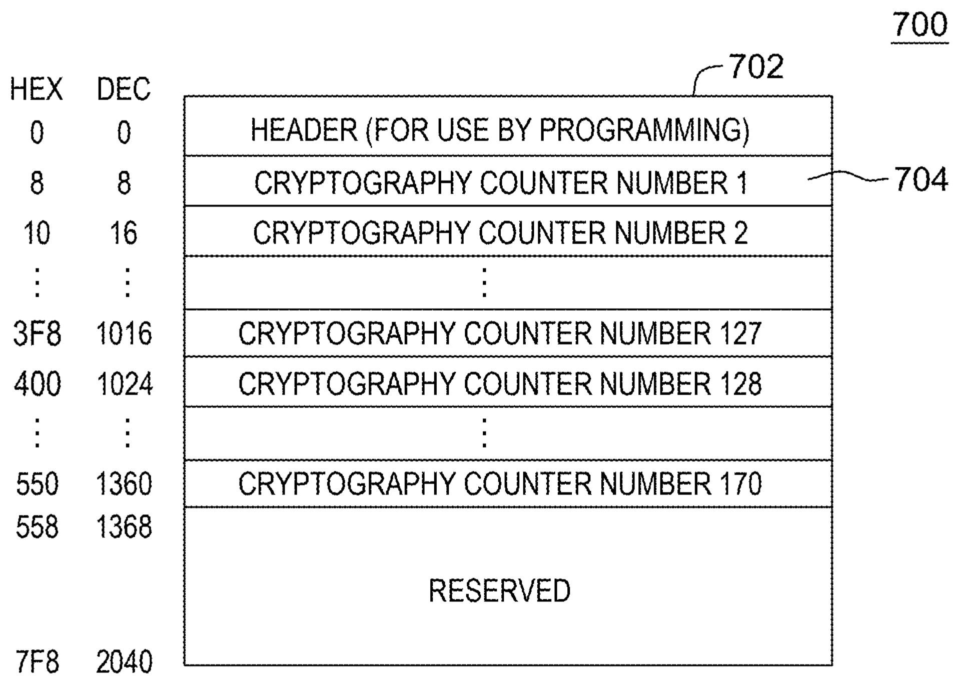

FIG. 7A 704 722

| COUNTER NUMBER | PROCESSOR ACTIVITY COUNTER NAME |
|---|---|
| 161 | KMAC-HMAC-SHA-224 FUNCTION ENDING WITH CC=0 |
| 162 | KMAC-HMAC-SHA-256 FUNCTION ENDING WITH CC=0 |
| 163 | KMAC-HMAC-SHA-384 FUNCTION ENDING WITH CC=0 |
| 164 | KMAC-HMAC-SHA-512 FUNCTION ENDING WITH CC=0 |
| 165 | KMAC-HMAC-ENCRYPTED-SHA-224 FUNCTION ENDING WITH CC=0 |
| 166 | KMAC-HMAC-ENCRYPTED-SHA-256 FUNCTION ENDING WITH CC=0 |
| 167 | KMAC-HMAC-ENCRYPTED-SHA-384 FUNCTION ENDING WITH CC=0 |
| 168 | KMAC-HMAC-ENCRYPTED-SHA-512 FUNCTION ENDING WITH CC=0 |

FIG. 7B

PROCESSOR ACTIVITY INSTRUMENTATION PROCESSING FOR CRYPTOGRAPHIC INSTRUCTIONS

BACKGROUND

One or more aspects relate, in general, to cryptographic instructions executed within a computing environment, and in particular, to processing associated with executing the cryptographic instructions.

Cryptography is used for the protection of data. There are a number of cryptographic functions, including various cryptographic hash functions, such as SHA-2 (Secure Hash Algorithm 2) and SHA-3, as examples, that may be used to protect data. A cryptographic hash function may be used to provide a message authentication code, such as a hash-based message authentication code (HMAC), used to verify data integrity and authenticity of a message.

Hash-based message authentication code processing uses two passes of hash computation, in which prior to each pass, a confidential key is used to derive multiple keys, including an inner-key and an outer-key. In the first pass, an internal hash is derived from the message and the inner-key, and in the second pass, a final hash-based message authentication code is derived from the inner hash result and the outer-key.

SUMMARY

Shortcomings of the prior art are overcome, and additional advantages are provided through the provision of a computer program product. The computer program product includes a set of one or more computer-readable storage media and program instructions, collectively stored in the set of one or more computer-readable storage media, for causing at least one computing device to perform computer operations. The computer operations include executing an instruction to perform cryptographic processing. Executing the instruction includes performing a plurality of operations of the instruction to generate a cryptographic result. Based on performing at least multiple operations of the plurality of operations, an access exception condition for a storage location used by an instrumentation counter is detected. The instrumentation counter is to be used to indicate that a particular cryptographic function has been used by the plurality of operations to generate the cryptographic result. Based on detecting the access exception condition, execution of the instruction is interrupted indicating incomplete processing. The instruction is re-executed to obtain access to the instrumentation counter. The re-executing the instruction starts from where execution was interrupted and includes updating the instrumentation counter, based on the storage location used by the instrumentation counter being validated.

In one or more aspects, a computer program product is provided. The computer program product includes a set of one or more computer-readable storage media and program instructions, collectively stored in the set of one or more computer-readable storage media, for causing at least one computing device to perform computer operations. The computer operations include executing an instruction to perform hash-based message authentication code processing. The instruction includes an indicator and executing the instruction includes performing a plurality of operations of the instruction to generate a hash-based message authentication code. Based on performing the plurality of operations, an access exception condition is detected for a storage location used by an instrumentation counter that is to be accessed by the instruction. The indicator is set to a selected value based on detecting the access exception condition. Based on detecting the access exception condition, execution of the instruction is interrupted indicating incomplete processing. The instruction is re-executed to obtain access to the instrumentation counter. The re-executing the instruction starts from where execution was interrupted as indicated by the indicator set to the selected value and includes updating the instrumentation counter.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 7A-7B depict examples of cryptography counters, in accordance with one or more aspects of the present disclosure;

DETAILED DESCRIPTION

Figure 1:
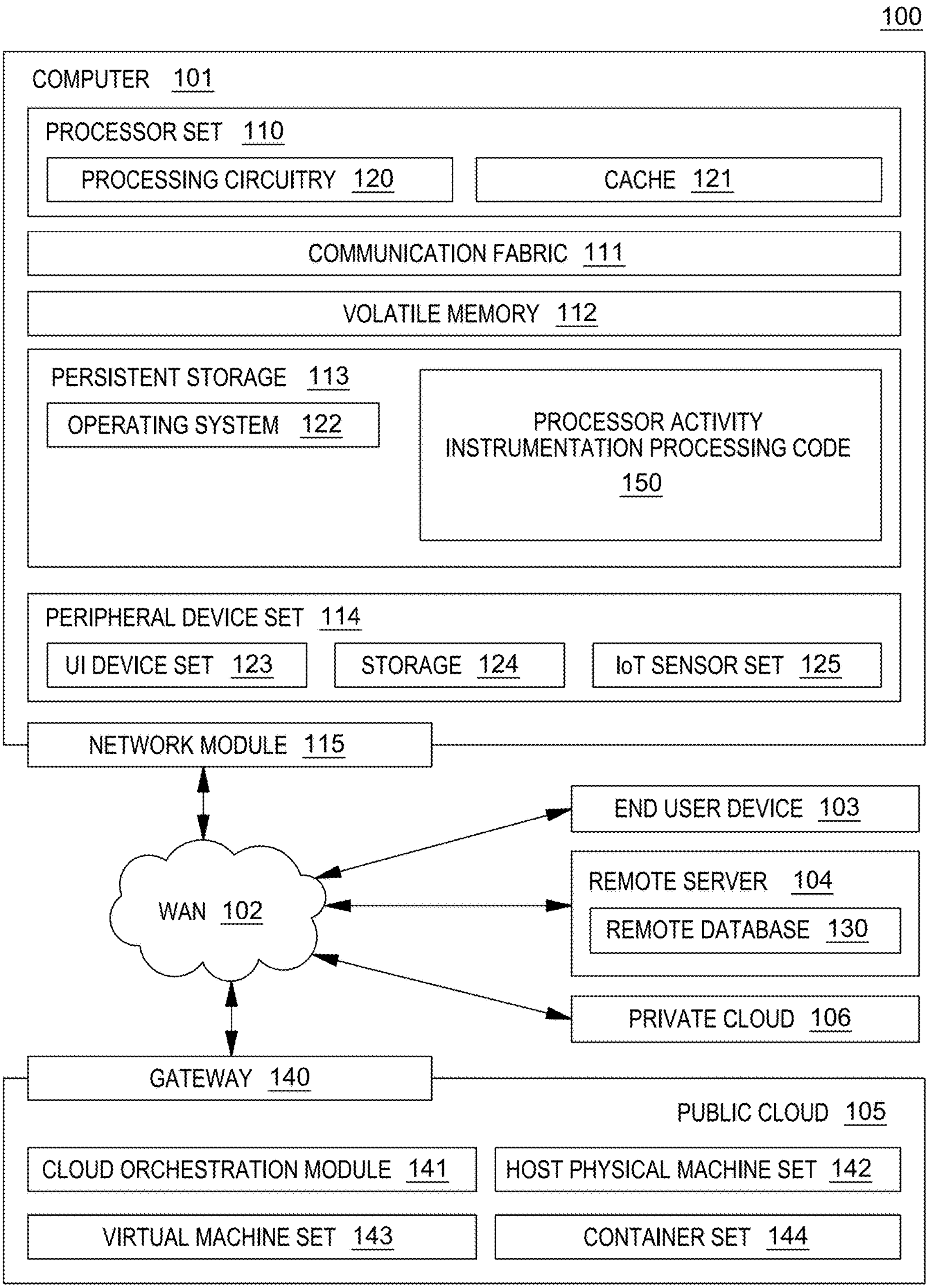
FIG. 1 depicts one example of a computing environment to incorporate and use one or more aspects of the present disclosure.

In accordance with one or more aspects of the present disclosure, a capability is provided to facilitate processing within a computing environment. In one or more aspects, processing is facilitated by performing processor activity instrumentation processing for selected instructions, such as cryptographic instructions. The processor activity instrumentation processing updates a counter that indicates, for instance, which cryptographic function was used by a cryptographic instruction in performing cryptographic processing to provide a cryptographic result. The processing is performed such that performance (e.g., software and hardware performance) is improved. For instance, a check of accessibility of the counter is performed at a selective time in the processing to reduce overhead and improve performance.

In one or more aspects, a counter, as used herein, is an instrumentation counter, such as a processor activity instrumentation counter. It is also referred to as a cryptography counter, an example of which is an instrumentation counter, such as a processor activity instrumentation counter. Other examples of counters may be used and/or other terms for counter may be used.

In one or more aspects, the processor activity instrumentation processing is performed as part of cryptographic processing, such as part of hash-based message authentication code processing, including accelerated and/or interruptible hash-based message authentication code processing. In other examples, it is part of other cryptographic processing, other processing and/or provided as separate processing. Various examples and/or variations are possible.

In one or more aspects, hash-based message authentication code processing, and therefore, processor activity instrumentation processing that is included therewith, is accelerated by providing an instruction (e.g., a single architected instruction) to perform the hash-based message authentication code processing using parameters of the instruction, as well as to perform the processor activity instrumentation processing. Further, in one or more aspects, hash-based message authentication code processing, and therefore, the processor activity instrumentation processing, is accelerated by allowing the instruction to be interrupted and then resumed from where it was interrupted using saved state of the instruction. This is in contrast to repeating the hash-based message authentication code processing or having to separately determine, external to the instruction, where the hash-based message authentication code processing was interrupted and where it should be resumed. Further, the saved state of the instruction is reduced by using an indicator (e.g., a cryptography counter update pending flag) to represent multiple states of instruction processing (e.g., accessibility of counter (e.g., instrumentation counter, such as a processor activity instrumentation counter), selected parts of hash-based message authentication code processing, etc.).

In one or more aspects, a single instruction (e.g., a compute message authentication code instruction or other instruction) is provided that encodes parameters to be used for hash-based message authentication code processing and processor activity instrumentation processing. The single instruction is interruptible and includes the state to be used to resume hash-based message authentication code processing without compromising security. The single instruction is executed in hardware (e.g., using at least one hardware accelerator), in one example. In one or more aspects, interruptible hash-based message authentication code processing that includes processor activity instrumentation processing is implemented which saves state information, such as, e.g., a chaining value, to be used to resume interrupted processing.

In one or more aspects, a format of the instruction (e.g., compute message authentication code instruction or other instruction) includes one or more parameters, such as, for instance: one or more keys (e.g., a cryptographic key), a message address, a message length, one or more control indicators (also referred to as flags), and/or state information. Additional, fewer and/or other parameters may be used. The instruction uses state information (e.g., a chaining or sequencing value and/or one or more indicators) to allow interruption and resuming of the hash-based message authentication code processing that includes processor activity instrumentation processing.

In one or more aspects, a computer program product is provided. The computer program product includes a set of one or more computer-readable storage media and program instructions, collectively stored in the set of one or more computer-readable storage media, for causing at least one computing device to perform computer operations. The computer operations include executing an instruction to perform cryptographic processing. Executing the instruction includes performing a plurality of operations of the instruction to generate a cryptographic result. Based on performing at least multiple operations of the plurality of operations, an access exception condition for a storage location used by an instrumentation counter is detected. The instrumentation counter is to be used to indicate that a particular cryptographic function has been used by the plurality of operations to generate the cryptographic result. Based on detecting the access exception condition, execution of the instruction is interrupted indicating incomplete processing. The instruction is re-executed to obtain access to the instrumentation counter. The re-executing the instruction starts from where execution was interrupted and includes updating the instrumentation counter, based on the storage location used by the instrumentation counter being validated. Overhead is reduced and performance is improved by detecting the instrumentation counter access exception subsequent to performing the at least multiple operations of the plurality of operations rather than at the start or middle of the function.

Additionally, or alternatively, in one or more embodiments, the cryptographic result is a message authentication code. Performance is improved and overhead is reduced in generating the message authentication code by using a single instruction to perform a plurality of operations and detecting an access exception condition subsequent to performing at least multiple operations of the plurality of operations.

Additionally, or alternatively, in one or more embodiments, the storage location used by the instrumentation counter is owned by a control program. Since the storage location used to store the instrumentation counter is owned by a control program and not the instruction, checking of accessibility of the instrumentation counter at selective times (e.g., after performing the at least multiple operations) reduces overhead and latency and improves system performance.

Additionally, or alternatively, in one or more embodiments, the updating the instrumentation counter is performed absent re-execution of the at least multiple operations. This saves processing cycles and improves performance.

Additionally, or alternatively, in one or more embodiments, the executing the instruction further includes setting an indicator to a selected value, based on detecting the access exception condition, and the re-executing the instruction includes checking the indicator to determine where execution was interrupted. This facilitates processing by using one indicator to indicate the access exception condition and to indicate where to resume processing. Performance is improved and complexity is reduced.

Additionally, or alternatively, in one or more embodiments, based on the indicator being set to the selected value and re-executing the instruction, processing of the at least multiple operations is bypassed. The at least multiple operations include an input message padding and hashing operation, an outer-key padding and hashing operation and an output message padding and hashing operation. By using the indicator to indicate the access exception condition and provide state, multiple other indicators are not needed, reducing the number of indicators, as well as flag checking complexity, which maximizes performance. In one example, the indicator indicates whether the access exception condition exists and whether selected operations (e.g., Part 3—input message padding and hashing operation; Part 4—outer-key padding and hashing operation; Part 5—output message padding and hashing operation) have been performed.

Additionally, or alternatively, in one or more embodiments, based on the indicator being set to the selected value and re-executing the instruction, the plurality of operations includes checking accessibility of the instrumentation counter and performing the updating of the instrumentation counter based on the instrumentation counter being accessible. Processing is facilitated by enabling the update of the counter, as part of instruction execution, even after an access exception condition is detected. The counter is updated without repeating processing that has already been performed (e.g., Parts 3, 4 and 5).

Additionally, or alternatively, in one or more embodiments, the executing the instruction includes setting the indicator to another selected value at initial execution of the instruction. This prevents termination of the instruction due to a software error, reduces flag checking and maximizes performance.

Additionally, or alternatively, in one or more embodiments, the performing the plurality of operations includes performing a sequence of hash operations on a message obtained using the instruction to generate an intermediate message digest. The performing the sequence of hash operations uses an output chaining value generated based on performing an inner-key padding and hashing operation using a cryptographic key of the instruction. An outer-key padding and hashing operation is performed using the cryptographic key to generate another output chaining value to be used in generating a final output message digest based on a final input message digest produced using the intermediate message digest. The final output message digest is a resulting authentication code. The resulting authentication code is the cryptographic result. Using a single instruction to perform a plurality of operations to generate an authentication code and update an instrumentation counter improves processing within the computing environment and reduces latency. Performance is higher and software processing overhead is reduced.

Additionally, or alternatively, in one or more embodiments, the performing the plurality of operations further includes performing the inner-key padding and hashing operation using the cryptographic key to generate the output chaining value. The performing the inner-key padding and hashing operation includes producing an inner-key based on performing a selected operation with the cryptographic key and an inner padding value, generating the output chaining value for the inner-key using a hash operation and an input chaining value, and storing the output chaining value that is generated in a parameter block that is input to the instruction. By performing the inner-key padding and hashing operation to generate the output chaining value as part of executing the single instruction, performance is improved.

Additionally, or alternatively, in one or more embodiments, the performing the sequence of hash operations on the message obtained using the instruction includes processing a plurality of message blocks of the message. The processing the plurality of message blocks includes performing a plurality of block digest hash operations on the plurality of message blocks using the output chaining value as input to the processing of the plurality of message blocks to obtain the intermediate message digest. Performing the plurality of operations further includes performing an input message padding and hashing operation for the message. The performing the input message padding and hashing operation for the message includes performing a padding operation on a final message block of the message to produce a padded input message block, and performing a hash operation, using the intermediate message digest, on the padded input message block to generate the final input message digest. By using a single instruction to perform the sequence of operations rather than chaining back-to-back accelerator calls to perform the sequence of operations, performance is improved, and latency and overhead are reduced.

Additionally, or alternatively, in one or more embodiments, the performing the outer-key padding and hashing operation includes producing an outer-key based on performing the selected operation with the cryptographic key and an outer padding value, and generating the another output chaining value for the outer-key using a selected hash operation and the input chaining value. By performing the outer-key padding and hashing operation to generate the other output chaining value as part of executing the single instruction, performance is improved.

Additionally, or alternatively, in one or more embodiments, the performing the plurality of operations further includes performing an output message padding and hashing operation. The performing the output message padding and hashing operation includes performing a final padding operation on the final input message digest to produce a padded output message block, and performing a final hashing operation, using the another output chaining value, on the padded output message block to generate the final output message digest. The final output message digest is the cryptographic result. By performing the output message padding and hashing operation as part of executing the single instruction, performance is improved and overhead and latency are reduced.

Additionally, or alternatively, in one or more embodiments, the performing the plurality of operations further includes performing the inner-key padding and hashing operation to generate the output chaining value, performing an input message padding and hashing operation for the message using the intermediate message digest to generate the final input message digest, and performing an output message padding and hashing operation using the final input message digest and the another output chaining value to produce the resulting authentication code. By performing the inner-key padding and hashing operation to generate the output chaining value, the input message padding and hashing operation for the message and the output message padding and hashing operation as part of executing the single instruction, performance is improved and overhead and latency are reduced.

In accordance with one or more aspects, each of the embodiments is separable and optional from one another. Further, embodiments may be combined with one another.

In one or more aspects, a computer system is provided. The computer system includes at least one computing device, a set of one or more computer-readable storage media and program instructions, collectively stored in the set of one or more computer-readable storage media, for causing at least one computing device to perform computer operations. The computer operations include executing an instruction to perform cryptographic processing. Executing the instruction includes performing a plurality of operations of the instruction to generate a cryptographic result. Based on performing at least multiple operations of the plurality of operations, an access exception condition for a storage location used by an instrumentation counter is detected. The instrumentation counter is to be used to indicate that a particular cryptographic function has been used by the plurality of operations to generate the cryptographic result. Based on detecting the access exception condition, execution of the instruction is interrupted indicating incomplete processing. The instruction is re-executed to obtain access to the instrumentation counter. The re-executing the instruction starts from where execution was interrupted and includes updating the instrumentation counter, based on the storage location used by the instrumentation counter being validated. Overhead is reduced and performance is improved by detecting the instrumentation counter access exception subsequent to performing the at least multiple operations of the plurality of operations rather than at the start or middle of the function.

Additionally, or alternatively, in one or more embodiments, the updating the instrumentation counter is performed absent re-execution of the at least multiple operations. This saves processing cycles and improves performance.

Additionally, or alternatively, in one or more embodiments, the executing the instruction further includes setting an indicator to a selected value, based on detecting the access exception condition, and the re-executing the instruction includes checking the indicator to determine where execution was interrupted. This facilitates processing by using one indicator to indicate the access exception condition and to indicate where to resume processing. Performance is improved and complexity is reduced.

Additionally, or alternatively, in one or more embodiments, based on the indicator being set to the selected value and re-executing the instruction, processing of the at least multiple operations is bypassed. The at least multiple operations include an input message padding and hashing operation, an outer-key padding and hashing operation and an output message padding and hashing operation. By using the indicator to indicate the access exception condition and provide state, multiple other indicators are not needed, reducing the number of indicators, as well as flag checking complexity, which maximizes performance. In one example, the indicator indicates whether the access exception condition exists and whether selected operations (e.g., Part 3—input message padding and hashing operation; Part 4—outer-key padding and hashing operation; Part 5—output message padding and hashing operation) have been performed.

In accordance with one or more aspects, each of the embodiments is separable and optional from one another. Further, embodiments may be combined with one another.

In one or more aspects, a computer-implemented method is provided. The computer-implemented method includes executing an instruction to perform cryptographic processing. Executing the instruction includes performing a plurality of operations of the instruction to generate a cryptographic result. Based on performing at least multiple operations of the plurality of operations, an access exception condition for a storage location used by an instrumentation counter is detected. The instrumentation counter is to be used to indicate that a particular cryptographic function has been used by the plurality of operations to generate the cryptographic result. Based on detecting the access exception condition, execution of the instruction is interrupted indicating incomplete processing. The instruction is re-executed to obtain access to the instrumentation counter. The re-executing the instruction starts from where execution was interrupted and includes updating the instrumentation counter, based on the storage location used by the instrumentation counter being validated. Overhead is reduced and performance is improved by detecting the instrumentation counter access exception subsequent to performing the at least multiple operations of the plurality of operations rather than at the start or middle of the function.

Additionally, or alternatively, in one or more embodiments, the updating the instrumentation counter is performed absent re-execution of the at least multiple operations. This saves processing cycles and improves performance.

Additionally, or alternatively, in one or more embodiments, the executing the instruction further includes setting an indicator to a selected value, based on detecting the access exception condition, and the re-executing the instruction includes checking the indicator to determine where execution was interrupted. This facilitates processing by using one indicator to indicate the access exception condition and to indicate where to resume processing. Performance is improved and complexity is reduced.

Additionally, or alternatively, in one or more embodiments, based on the indicator being set to the selected value and re-executing the instruction, processing of the at least multiple operations is bypassed. The at least multiple operations include an input message padding and hashing operation, an outer-key padding and hashing operation and an output message padding and hashing operation. By using the indicator to indicate the access exception condition and provide state, multiple other indicators are not needed, reducing the number of indicators, as well as flag checking complexity, which maximizes performance. In one example, the indicator indicates whether the access exception condition exists and whether selected operations (e.g., Part 3—input message padding and hashing operation; Part 4—outer-key padding and hashing operation; Part 5—output message padding and hashing operation) have been performed.

Additionally, or alternatively, in one or more embodiments, based on the indicator being set to the selected value and re-executing the instruction, the plurality of operations includes checking accessibility of the instrumentation counter and performing the updating of the instrumentation counter based on the instrumentation counter being accessible. Processing is facilitated by enabling the update of the counter, as part of instruction execution, even after an access exception condition is detected. The counter is updated without repeating processing that has already been performed (e.g., Parts 3, 4 and 5).

In accordance with one or more aspects, each of the embodiments is separable and optional from one another. Further, embodiments may be combined with one another.

In one or more aspects, a computer program product is provided. The computer program product includes a set of one or more computer-readable storage media and program instructions, collectively stored in the set of one or more computer-readable storage media, for causing at least one computing device to perform computer operations. The computer operations include executing an instruction to perform hash-based message authentication code processing. The instruction includes an indicator and executing the instruction includes performing a plurality of operations of the instruction to generate a hash-based message authentication code. Based on performing the plurality of operations, an access exception condition is detected for a storage location used by an instrumentation counter to be accessed by the instruction. The indicator is set to a selected value based on detecting the access exception condition. Based on detecting the access exception condition, execution of the instruction is interrupted indicating incomplete processing. The instruction is re-executed to obtain access to the instrumentation counter. The re-executing the instruction starts from where execution was interrupted as indicated by the indicator set to the selected value and includes updating the instrumentation counter. Overhead is reduced and performance is improved by detecting the instrumentation counter access exception subsequent to performing the at least multiple operations of the plurality of operations rather than at the start or middle of the function. Further, processing is facilitated, complexity is reduced, and performance is improved by using an indicator to indicate an access exception condition, as well as where to resume processing.

In accordance with one or more aspects, each of the embodiments is separable and optional from one another. Further, embodiments may be combined with one another.

In one or more aspects, a computer-implemented method is provided. The computer-implemented method includes executing an instruction to perform hash-based message authentication code processing. The instruction includes an indicator and executing the instruction includes performing a plurality of operations of the instruction to generate a hash-based message authentication code. Based on performing the plurality of operations, an access exception condition is detected for a storage location used by an instrumentation counter to be accessed by the instruction. The indicator is set to a selected value based on detecting the access exception condition. Based on detecting the access exception condition, execution of the instruction is interrupted indicating incomplete processing. The instruction is re-executed to obtain access to the instrumentation counter. The re-executing the instruction starts from where execution was interrupted as indicated by the indicator set to the selected value and includes updating the instrumentation counter. Overhead is reduced and performance is improved by detecting the instrumentation counter access exception subsequent to performing the at least multiple operations of the plurality of operations rather than at the start or middle of the function. Further, processing is facilitated, complexity is reduced, and performance is improved by using an indicator to indicate an access exception condition, as well as where to resume processing.

In accordance with one or more aspects, each of the embodiments is separable and optional from one another. Further, embodiments may be combined with one another.

In one or more aspects, a computer program product is provided. The computer program product includes a set of one or more computer-readable storage media and program instructions, collectively stored in the set of one or more computer-readable storage media, for causing at least one computing device to perform computer operations. The computer operations include executing an instruction to perform cryptographic processing. Executing the instruction includes performing a plurality of operations of the instruction to generate a cryptographic result. Based on performing at least multiple operations of the plurality of operations, an access exception condition for a storage location used by an instrumentation counter is detected. The instrumentation counter is to be used to indicate that a particular cryptographic function has been used by the plurality of operations to generate the cryptographic result. Based on detecting the access exception condition, execution of the instruction is interrupted indicating incomplete processing. The instruction is re-executed to obtain access to the instrumentation counter. The re-executing the instruction starts from where execution was interrupted and includes updating the instrumentation counter, based on the storage location used by the instrumentation counter being validated. The storage location used by the instrumentation counter is owned by a control program. Executing the instruction further includes setting an indicator to a selected value, based on detecting the access exception condition, and the re-executing the instruction includes checking the indicator to determine where execution was interrupted. Overhead is reduced and performance is improved by detecting the instrumentation counter access exception subsequent to performing the at least multiple operations of the plurality of operations rather than at the start or middle of the function. Since the storage location used to store the instrumentation counter is owned by a control program and not the instruction, checking of accessibility of the instrumentation counter at selective times (e.g., after performing the at least multiple operations) reduces overhead and latency and improves system performance. Using one indicator to indicate the access exception condition and to indicate where to resume processing facilitates processing. Performance is improved and complexity is reduced.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that performs processor activity instrumentation processing and/or cryptographic processing including processor activity instrumentation processing, accelerated hash-based message authentication code processing and/or interruptible hash-based message authentication code processing and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as processor activity instrumentation processing code 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud computing services and/or microservices (not separately shown in FIG. 1): private and public clouds 106, 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above is only one example of a computing environment to incorporate, perform and/or use one or more aspects of the present disclosure. Other examples are possible. For instance, in one or more embodiments, one or more of the components/modules/blocks of FIG. 1 are not included in the computing environment and/or are not used for one or more aspects of the present disclosure. Further, in one or more embodiments, additional and/or other components/modules/blocks may be used. Other variations are possible.

Figure 2:
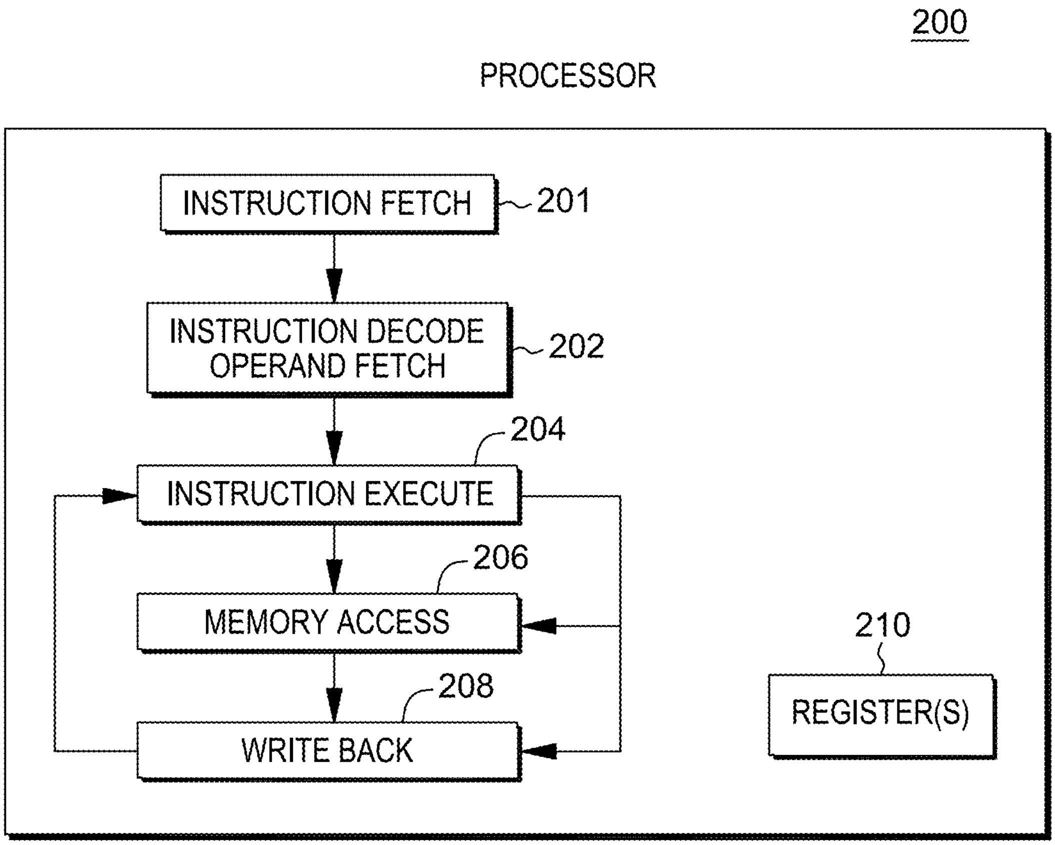
FIG. 2 depicts one example of further details of a processor of the processor set of FIG. 1, in accordance with one or more aspects of the present disclosure.

In one example, a processor (e.g., of processor set 110) includes a plurality of functional components (or a subset thereof) used to execute instructions. As depicted in FIG. 2, in one example, a processor 200 includes, for instance, an instruction fetch component 201 to fetch instructions to be executed; an instruction decode/operand fetch component 202 to decode the fetched instructions and to obtain operands of the decoded instructions; one or more instruction execute components 204 to execute the decoded instructions; a memory access component 206 to access memory for instruction execution, if necessary; and a write back component 208 to provide the results of the executed instructions. One or more of the components may access and/or use one or more registers 210 in instruction processing. Further, one or more of the components may access and/or use processor activity instrumentation processing code 150. Additional, fewer and/or other components may be used in one or more aspects of the present disclosure.

In one or more aspects, processor activity instrumentation processing is performed as part of cryptographic processing, including hash-based message authentication code processing and/or other cryptographic processing. Further, in other examples, it may be performed as part of other processing and/or independently thereof (i.e., separate from other processing but in addition to other processing). Many examples are possible.

In the examples herein, processor activity instrumentation processing is performed as part of hash-based message authentication code processing, and therefore, further details regarding hash-based message authentication code processing are provided. In one example, hash-based message authentication code processing is to be performed and, in one or more aspects, such processing is accelerated. In one example, a hash-based message authentication code (HMAC) algorithm or technique includes:

$$HMAC(K, m) = H((K' \oplus opad) \| H((K' \oplus opad) \| m)),$$

where H is a cryptographic hash function; K is a confidential key; m is the message to be authenticated; K' is another confidential key, derived from the original key K (e.g., padding K to the right with extra zeros to the input block size of the hash function, or hashing K if it is longer than the block size, as examples); || denotes concatenation; ⊕ denotes exclusive OR (XOR); opad is the outer padding (0x5c5c5c . . . 5c5c, one block-long hexadecimal constant); ipad is the inner padding (0x363636 . . . 3636, one block-long hexadecimal constant); for HMAC using SHA-256, the key is padded to 64 bytes; and the output per HMAC invocation is 32 bytes/256 bits. Other examples are possible.

Figure 3A:
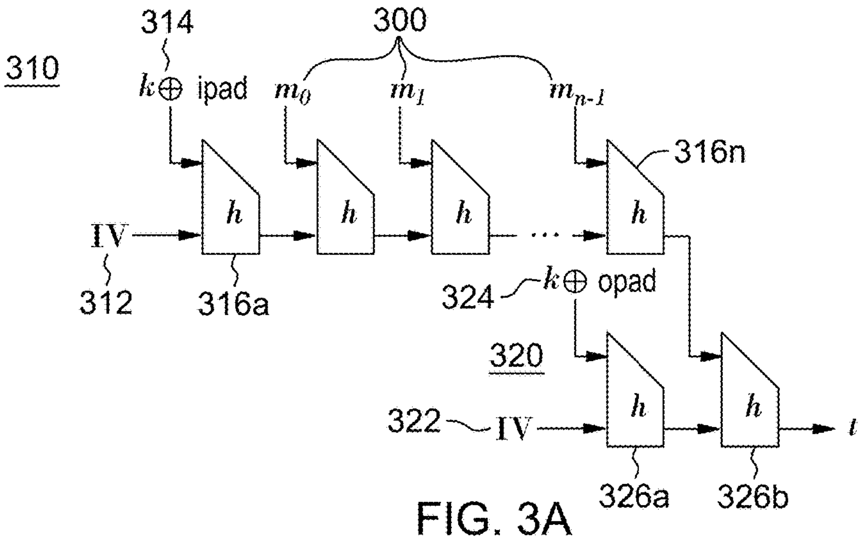
FIG. 3A depicts one example of hash-based message authentication code block processing.

In one example, as depicted in FIG. 3A, the message is broken up into blocks 300 (e.g., $m_0$, $m_1$ . . . $m_{n-1}$) and an iterative hash function (h) is performed over the message. In a first pass 310 of the hashing, in one example, an initial chaining value (IV) 312 and k⊕ipad 314 are input to a first hash function 316*a* of the first pass, and in a second pass 320 of the hashing, in one example, an initial chaining value (IV) 322 and k⊕opad 324 are input to the first hash function 326*a* of the second pass. Further, the output of the last hash function 316*n* of the first pass is input to a second hash function 326*b* of the second pass along with the output of the first hash function 326*a* of the second pass.

Figure 3B:
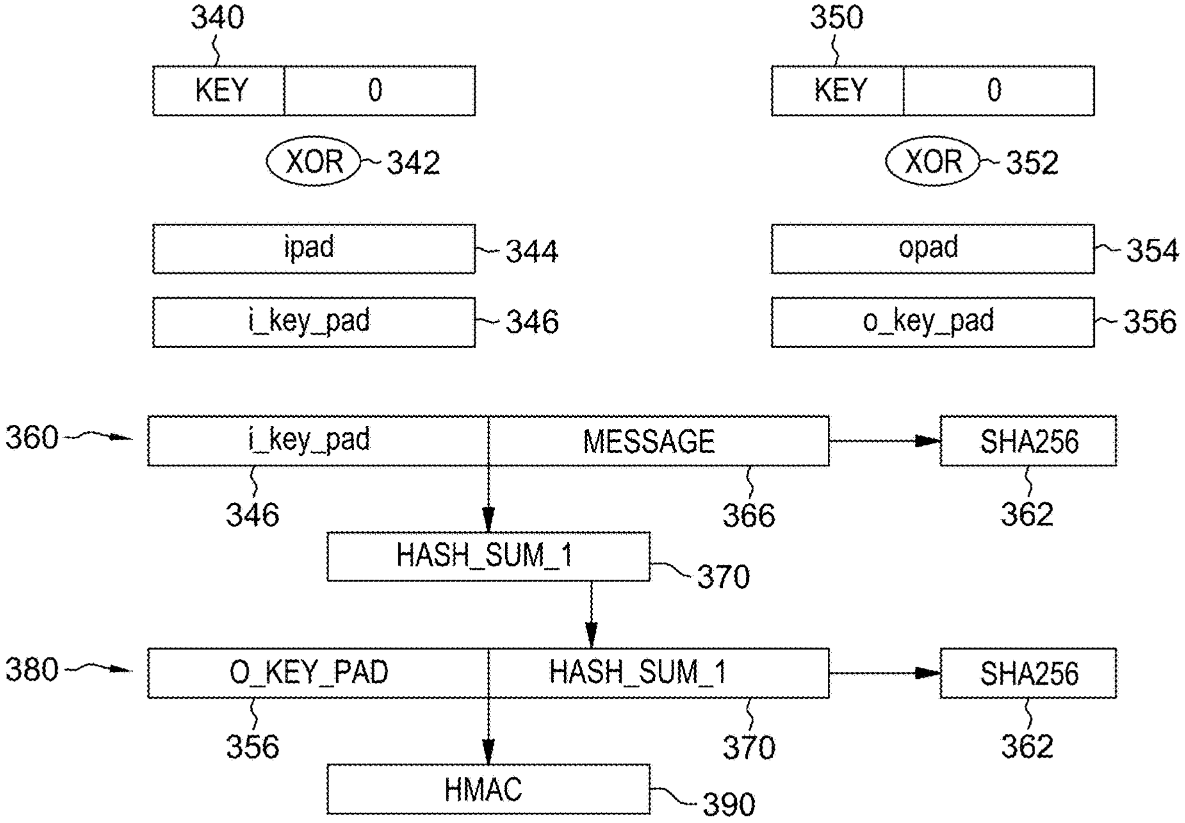
FIG. 3B depicts further details of one example of hash-based message authentication code block processing.

As further described in FIG. 3B, in one example, a key 340 is exclusive-ORed 342 with ipad 344 to produce i_key_pad 346. Similarly, a key 350 is exclusive-ORed 352 with opad 354 to produce o_key_pad 356. A first pass 360 of the hash computation using, e.g., SHA-256 (362) produces an internal hash (hash_sum_1 (370)) derived from the inner-key (e.g., i_key_pad 346) and the message 366. The internal hash (hash_sum_1) 370 is input to a second pass 380 of the hash computation which uses SHA-256 (362) to produce a hash-based authentication code (e.g., hash-based message authentication code (HMAC) 390) derived from o_key_pad 356 and hash_sum_1 (370).

In one example, a SHA-2 accelerator is used to perform the first pass and the second pass. Thus, in one example, back-to-back SHA-2 accelerator calls are chained to perform the passes resulting in a large processing overhead. Further, each small hashing block (e.g., each hash 316*a* . . . 316*n* of FIG. 3A) is performed by invocation of an instruction, resulting in increased processing overhead and latency.

Therefore, in accordance with one or more aspects, a hash-based message authentication code processing capability (also referred to as accelerated hash-based message authentication code processing) is provided in which a single invocation of an instruction is able to perform multiple (and potentially all) hashing blocks during the single invocation. Further, in one or more aspects, the instruction may be interrupted and re-executed, but in such a scenario, state of the instruction (e.g., a chaining value) is saved such that processing may be resumed from where it ended.

In one or more aspects, the single instruction is configured to perform multiple operations of the hash-based message authentication code processing including, for instance, at least, a sequence of hash operations on the message and an outer-key padding operation. Other operations may also be performed as part of the execution of the single instruction, including, but not limited to, an inner-key padding operation, an input message padding and hashing operation and/or an output message padding and hashing operation. These multiple operations are performed, for instance, as part of a single invocation of the instruction, thereby increasing processing speed and reducing latency. Further, in one or more aspects, one or more of the keys may be wrapped, thereby providing key protection.

Additionally, in one or more aspects, as part of hash-based message authentication code processing, processor activity instrumentation processing is performed to determine whether a particular processor activity has been performed. This processing is enhanced to reduce latency, reduce processing time and increase performance. In one or more aspects, the processor activity instrumentation processing is a further operation performed as part of execution of the single instruction.

In one or more aspects, the processor activity instrumentation processing uses processor activity instrumentation processing code (e.g., processor activity instrumentation processing code 150) to perform processor activity instrumentation processing to determine whether a particular processor activity has been performed. An example processor activity is use of a particular cryptographic function. Other examples are possible. Processor activity instrumentation processing code (e.g., processor activity instrumentation processing code 150) includes code or instructions used to perform processor activity instrumentation processing, and/or perform other tasks, including but not limited to, performing hash-based message authentication code processing, in accordance with one or more aspects of the present disclosure.

In one example, processor activity instrumentation processing code (e.g., processor activity instrumentation processing code 150) includes code to be used to perform processor activity instrumentation processing separate and/or as a part of cryptographic processing, such as hash-based message authentication code processing. The code is, e.g., computer-readable program code (e.g., instructions) in computer-readable storage media, e.g., storage (persistent storage 113, cache 121, storage 124, other storage, as examples). The computer-readable storage media may be part of one or more computer program products and the computer-readable program code may be executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s);

processing circuitry, such as processing circuitry 120 of processor set 110 and/or other processing circuitry; one or more hardware accelerators separate and/or part of one or more processors and/or processing circuitry; and/or other computing devices, etc.). Additional and/or other computers, servers, devices, processors, nodes, processing circuitry, accelerators and/or computing devices may be used to execute the code and/or portions thereof. Many examples are possible.

One example of processor activity instrumentation processing code 150 is described with reference to FIG. 4A. In one example, processor activity instrumentation processing code 150 includes obtain instruction code 400 to obtain (e.g., receive, be provided, pull, retrieve, fetch, etc.) an instruction, such as a compute message authentication code instruction, that performs processor activity instrumentation processing, as well as hash-based message authentication code processing, including accelerated and/or interruptible hash-based message authentication code processing; and execute instruction code 410 to execute the instruction.

Further details of execute instruction code 410 are described with reference to FIG. 4B. In one example, execute instruction code 410 includes obtain operands code 412 to obtain one or more operands and/or information of the obtained instruction; perform operations code 416 to perform processor activity instrumentation processing, as well as hash-based message authentication code processing of the instruction, including accelerated and/or interruptible hash-based message authentication code processing; and provide result code 418 to provide a result of the instruction.

One example of an instruction to perform processor activity instrumentation processing is a compute message authentication code instruction, which also performs hash-based message authentication code processing, including accelerated and/or interruptible hash-based message authentication code processing. In one example, a compute message authentication code instruction, such as a Compute Message Authentication Code instruction, is a single architected hardware machine instruction at the hardware/software interface. As an example, it is part of an instruction set architecture. One example of an instruction set architecture to incorporate and/or use a compute message authentication code instruction, other message authentication instructions, other instructions and/or aspects of the present disclosure is the z/Architecture® instruction set architecture offered by International Business Machines Corporation, Armonk, New York. One embodiment of the z/Architecture instruction set architecture is described in a publication entitled, "z/Architecture Principles of Operation," IBM Publication No. SA22-7832-13, Fourteenth Edition, May 2022, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present disclosure. z/Architecture and IBM are trademarks or registered trademarks of International Business Machines Corporation in at least one jurisdiction.

Figure 5A:
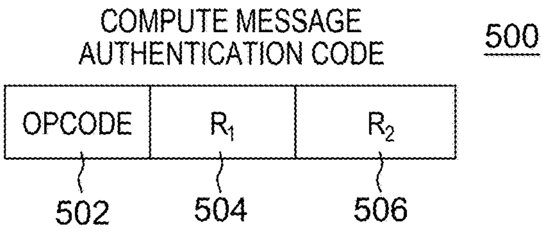
FIG. 5A depicts one example of a format of a Compute Message Authentication Code instruction, in accordance with one or more aspects of the present disclosure.

In one example, referring to FIG. 5A, a Compute Message Authentication Code instruction 500 has a format, referred to as a register and register with an extended operation code (opcode) format, having, e.g., 32 bits, and includes, for instance, an operation code field 502 (e.g., bits 0-15); one register field ($R_1$) 504 (e.g., bits 24-27); and another register field ($R_2$) 506 (e.g., bits 28-31). Although in this example there is one opcode field 502, in other examples, there may be more than one opcode field. For instance, there may be one opcode field at the beginning of the instruction format and one opcode field at the end of the instruction format. Further, in one example, the $R_1$ field is ignored; in other examples, the $R_1$ field is not included. Other examples are also possible.

Figure 5B:
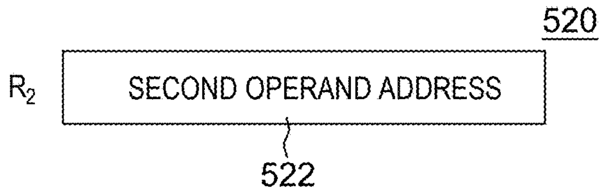
FIGS. 5B-5C depict examples of contents of registers used by the Compute Message Authentication Code instruction of FIG. 5A, in accordance with one or more aspects of the present disclosure.
Figure 5C:
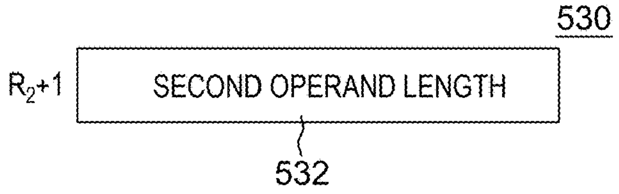

In one example, referring to FIGS. 5A and 5B, register field ($R_2$) 506 specifies a register 520 ($R_2$) that includes a second operand address 522 of a second operand of the instruction. Referring to FIG. 5C, another register 530 ($R_2$+1) includes a length 532 of the second operand.

In one example, the $R_2$ field designates an even-odd pair of general registers and is to designate an even-numbered register other than, e.g., general register 0; otherwise, a specification exception is recognized, in one example. In other examples, other types of registers other than general registers may be used. Further, registers other than even-numbered registers may be designated. Many examples are possible.

In one example, the location of the leftmost byte of the second operand is specified by the contents of the $R_2$ general register. The number of bytes in the second operand location is specified in, e.g., general register $R_2$+1.

In one example, the second operand length is to be a multiple of the data block size when the designated function is a hash-based message authentication code function and an intermediate input message part flag (described herein) is, e.g., one; otherwise, a specification exception is recognized, in one example. As examples, for function codes 112 (hash-based message authentication code-SHA-224) and 113 (hash-based message authentication code-SHA-256), the data block size is 64 bytes; and for function codes 120 (hash-based message authentication code-encrypted-SHA-224) and 121 (hash-based message authentication code-encrypted-SHA-256), the data block size is 64 bytes. Other data block sizes are possible, as well as other functions/function codes.

When a hash-based message authentication code function is specified and the intermediate input message part flag is, e.g., zero, the second operand length can have any value, including zero. When a hash-based message authentication code function is specified and the intermediate input message part flag is, e.g., one and the inner-key padding flag is, e.g., initially zero and the second operand length is, e.g., initially zero, a specification exception is recognized, in one example. When a hash-based message authentication code function is specified and a cryptography counter update pending flag (described herein) is, e.g., one and the second operand length is not, e.g., initially zero, the cryptography counter update pending flag is set to, e.g., zero. When a hash-based message authentication code function is specified and the cryptography counter update pending flag is, e.g., one and the intermediate input message part flag is, e.g., zero and the inner-key padding flag is, e.g., initially zero and the second operand length is, e.g., initially zero, the cryptography counter update pending flag is set to, e.g., zero.

As part of the operation, the address in general register $R_2$ is incremented by the number of bytes processed from the second operand, and the length in general register $R_2$+1 is decremented by the same number. The formation and updating of the addresses and length is dependent on, for instance, the addressing mode.

In, for instance, the 24-bit addressing mode, the contents of bit positions 40-63 of general register $R_2$ constitute the address of the second operand, and the contents of bit positions 0-39 are ignored; bits 40-63 of the updated address replace the corresponding bits in general register $R_2$, carries out of, e.g., bit position 40 of the updated address are ignored, and the contents of bit positions 32-39 of general register $R_2$ are set to, e.g., zeros. In the 31-bit addressing mode, the contents of bit positions 33-63 of general register $R_2$ constitute the address of the second operand, and the contents of bit positions 0-32 are ignored; bits 33-63 of the updated address replace the corresponding bits in general register $R_2$, carries out of, e.g., bit position 33 of the updated address are ignored, and the content of bit position 32 of general register $R_2$ is set to, e.g., zero. In the 64-bit addressing mode, the contents of bit positions 0-63 of general register $R_2$ constitute the address of the second operand; bits 0-63 of the updated address replace the contents of general register $R_2$, and carries out of, e.g., bit position 0 are ignored. Other examples are possible.

In both the 24-bit and the 31-bit addressing modes, the contents of bit positions 32-63 of general register $R_2+1$ form a 32-bit unsigned binary integer which specifies the number of bytes in the second operand; and the updated value replaces the contents of bit positions 32-63 of general register $R_2+1$. In the 64-bit addressing mode, the contents of bit positions 0-63 of general register $R_2+1$ form a 64-bit unsigned binary integer which specifies the number of bytes in the second operand; and the updated value replaces the contents of general register $R_2+1$.

In the 24-bit or 31-bit addressing mode, the contents of bit positions 0-31 of general registers $R_2$ and $R_2+1$, remain unchanged, in one example.

In the access register mode, access registers 1 and $R_2$ specify the address spaces containing the parameter block and the second operand, respectively.

Further, in one example, the Compute Message Authentication Code instruction uses multiple implied general registers, such as general register 0 (GR0) and general register 1 (GR1). These registers are referred to as implied registers since they are not explicitly referenced by one or more fields of the instruction; however, they are used by the instruction. Examples of the registers are described below.

Figure 5D:
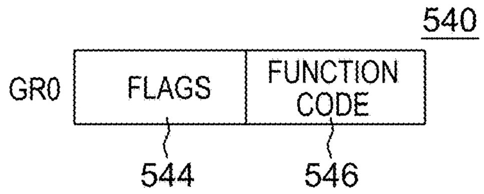
FIGS. 5D-5E depict examples of contents of general registers used by the Compute Message Authentication Code instruction of FIG. 5A, in accordance with one or more aspects of the present disclosure.

In one example referring to FIG. 5D, a general register 0 (540) includes, for instance:

Flags 544 (e.g., bits 48-55): In one example, bit positions 48-55 of general register 0 contain an 8-bit flags field controlling an operation of the function. The flags field and/or certain flags (also referred to as control indicators) is/are meaningful for selected function codes of the instruction, as described herein. One example format of the flags field is as follows:

Inner-Key Padding: In one example, bit 0 of the flags field indicates if the inner-key padding and hashing operation has been performed. The inner-key padding flag is meaningful when the function code in bits 57-63 of general register 0 designates, e.g., a hash-based message authentication code function (function codes 112-115 and 120-123).

When the inner-key padding flag is, e.g., zero, the inner-key padding and hashing operation has not been performed; otherwise, the inner-key padding and hashing operation has been performed.

Intermediate Input Message Part: In one example, bit 1 of the flags field indicates if operand 2 contains the intermediate input message part. The intermediate input message part flag is meaningful when, e.g., the function code in bits 57-63 of general register 0 designates a hash-based message authentication code function (e.g., function codes 112-115 and 120-123).

When the intermediate input message part flag is, e.g., zero, operand 2 contains the last input message part; otherwise, operand 2 contains the intermediate input message part.

In one example, when the intermediate input message part flag is, e.g., one, the second operand length is to be a multiple of the data block size. When the intermediate input message part flag is, e.g., zero and the last input message block contains a partial input message, the partial message block length (L), used in the final step of SHA padding, is set to the length of the last input message block; otherwise, L is set to, e.g., zero. If the operation ends due to partial completion, a specified condition code (e.g., condition code 3) is set.

Cryptography Counter Update Pending: In one example, bit 2 of the flags field indicates if a cryptography counter access exception has been detected. The cryptography counter update pending flag is meaningful when the function code in bits 57-63 of general register 0 designates a hash-based message authentication code function (e.g., function codes 112-115 and 120-123) and the second operand length is, e.g., zero. The program should set the cryptography counter update pending flag to, e.g., zero before the first issuance of the instruction and not update it in the subsequent re-drive of the same instruction; otherwise, the hash-based message authentication code algorithm may not be processed correctly.

When the cryptography counter update pending flag is, e.g., zero, the cryptography counter access exception either has not been detected or the cryptography counter access exception has been resolved; otherwise, the cryptography counter access exception has been detected.

When the cryptography counter update pending flag is, e.g., one and the second operand length is not, e.g., initially zero, the cryptography counter update pending flag is set to, e.g., zero. When the cryptography counter update pending flag is, e.g., one, the intermediate input message part flag is, e.g., zero, the inner-key padding flag is, e.g., initially zero, and the second operand length is, e.g., initially zero, the cryptography counter update pending flag is set to, e.g., zero. If the operation ends due to partial completion, a specified condition code (e.g., condition code 3) is set.

Reserved: In one example, bits 3-7 of the flags field are reserved and should contain, e.g., zeros; otherwise, the program may not operate compatibly in the future.

General Register 0 further includes, for instance:

Function code 546 (e.g., bits 57-63): In one example, bit positions 57-63 of general register 0 include the function code that specifies a function to be performed by the Compute Message Authentication Code instruction. The instruction is configured to specify and implement a plurality of functions and respective function codes. Example function codes to be used, in accordance with one or more aspects of the present disclosure, include, for instance, a function code (e.g., function code 112) that specifies a hash-based message authentication code-SHA-224 function; a function code (e.g., function code 113) that specifies a hash-based message authentication code-SHA-256 function; a function code (e.g., function code 120) that specifies a hash-based message authentication code-encrypted-SHA-224 function; and/or a function code (e.g., function code 121) that specifies a hash-based message authentication code-encrypted-SHA-256 function, etc. Although example functions and/or function codes may be specified, additional, fewer and/or other functions/function codes may be specified and/or used. Many examples are possible.

Further, in one example, one or more selected bits, e.g., bit 56 of general register 0, are to be, e.g., zero; otherwise, a specification exception is recognized, in one example. Bit positions 0-31 of general register 0 are ignored, in one example. When the function code in bits 57-63 of general register 0 of the Compute Message Authentication Code instruction specifies a hash-based message authentication code function (e.g., function code 112-113, 120-121 or other selected function codes) and the specified hash-based message authentication code function code is valid, bits positions 32-47 of general register 0 are reserved and should contain, e.g., zeros; otherwise, the program may not operate compatibly in the future.

In one example, when, for instance, message-security-assist extension 11 is installed, flags field 544, inner-key padding flag (e.g., bit 0 of the flags field), intermediate input message part flag (e.g., bit 1 of the flags field), and cryptography counter update pending flag (e.g., bit 2 of the flags field) are defined, and function codes 112, 113, 120 and 121 (and/or other selected function codes) are valid for the Compute Message Authentication Code instruction.

Figure 5E:
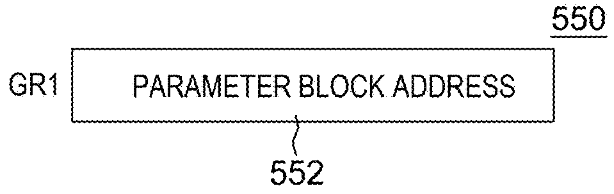

One example of general register 1 is depicted in FIG. 5E. In one example, a general register 1 (550) includes an address 552 of a parameter block in storage (e.g., memory, storage, etc.). For instance, address 552 is a logical address of, for instance, a leftmost byte of the parameter block in storage. In one example, the location of the address in the general register depends on the addressing mode. For instance, in the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address and the contents of bit positions 0-32 are ignored. In the 64-bit addressing mode, the contents of bit positions 0-63 of general register 1 constitute the address. In the access register mode, access register 1 specifies the address space containing the parameter block. Other examples are possible.

Figure 5F:
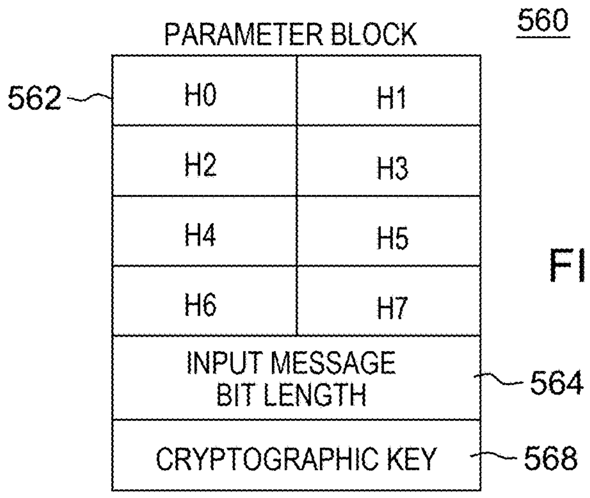
FIG. 5F depicts one example of a parameter block used by the Compute Message Authentication Code instruction of FIG. 5A, in accordance with one or more aspects of the present disclosure.

One example of a parameter block used by the Compute Message Authentication Code instruction hash-based message authentication code SHA-224/SHA-256 functions is described with reference to FIG. 5F. In one example, a parameter block, e.g., parameter block 560, used by the Compute Message Authentication Code instruction hash-based message authentication code SHA-224/SHA-256 functions includes, for instance:

Chaining value 562 (called H fields) is in, e.g., byte offsets 0-31 of parameter block 560. In one example, the chaining value is formed by concatenating the H fields (e.g., H0-H7) together in order, starting with H0 on the left and ending with H7 on the right.

In one example, the initial chaining value (ICV) is the chaining value (CV) in the parameter block which is used as input to the SHA block digest algorithm, an example of which is described herein.

In one example, each SHA block digest algorithm contains a specific set of constants called the initial hash value ($H^{(0)}$). It is used as the initial chaining value of the first (leftmost) message block of a set of message blocks to be hashed.

In one example, for SHA-256, the initial hexadecimal chaining value ($H^{(0)}$) constants are listed as follows:

| | | | |
|---|---|---|---|
| H0 = 6A09 E667 | H1 = BB67 AE85 | H2 = 3C6E F372 | H3 = A54F F53A |
| H4 = 510E 527F | H5 = 9B05 688C | H6 = 1F83 D9AB | H7 = 5BE0 CD19 |

In one example, the SHA-224 algorithm is the same as the SHA-256 algorithm, except that the initial chaining value ($H^{(0)}$) constants and the final message digest lengths are different. The program may obtain the SHA-224 message digest using the SHA-256 functions with the following two actions:

a. The following initial hexadecimal chaining value ($H^{(0)}$) constants for SHA-224 are used:

| | | | |
|---|---|---|---|
| H0 = C105 9ED8 | H1 = 367C D507 | H2 = 3070 DD17 | H3 = F70E 5939 |
| H4 = FFC0 0B31 | H5 = 6858 1511 | H6 = 64F9 8FA7 | H7 = BEFA 4FA4 |

b. The 224-bit message digest is obtained by truncating the final message digest to its leftmost 224 bits.

In one example, an output chaining value (OCV) is the output of the SHA block digest algorithm, which is stored into the chaining value of the parameter block, as described herein, in one example.

Input message bit length 564 is in, e.g., byte offsets 32-39 of parameter block 560. In one example, input message bit length 564 in parameter block 560 includes the bit length of the total input message to be hashed.

In one example, if the input message bit length is not, e.g., a multiple of 8, the program is to store, e.g., zeros in the unused bit positions of the last byte of the input message and round-up the input message bit length (IMBL) to a multiple of 8, in one example.

In one example, an output message bit length includes the bit length of the total output message to be hashed.

Cryptographic key (K) 568 is in, e.g., byte offsets 40-103.

In one example, if the program's cryptographic key is smaller than the cryptographic key in the parameter block, the program is to append zeros on the right side of the program's cryptographic key to enlarge it to the same size as the cryptographic key in the parameter block.

In one example, the program's original cryptographic key is not to be larger than the cryptographic key in the parameter block because $H^{(0)}$ (instead of the chaining value from the parameter block) is used when hashing the inner-padded key. That is, in one example, the program is not to use an appropriate SHA algorithm to reduce the original cryptographic key to the same size as the cryptographic key in the parameter block.

The parameter block may include additional, fewer and/or other information. Other examples and variations are possible.

Figure 5G:
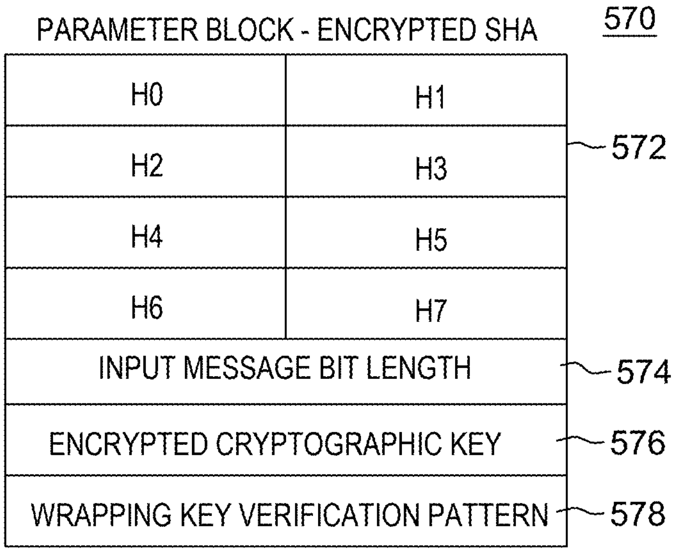
FIG. 5G depicts another example of a parameter block used by the Compute Message Authentication Code instruction of FIG. 5A, in accordance with one or more aspects of the present disclosure.

One example of a parameter block used by the Compute Message Authentication Code instruction hash-based message authentication code encrypted SHA-224/SHA-256 functions is described with reference to FIG. 5G. In one example, a parameter block, e.g., a parameter block 570, used by the Compute Message Authentication Code instruction hash-based message authentication code encrypted SHA-224/encrypted SHA-256 functions includes, for instance:

Chaining value 572 (called H fields) is in, e.g., byte offsets 0-31 of parameter block 570. In one example, the chaining value is formed by concatenating the H fields (e.g., H0-H7) together in order, starting with H0 on the left and ending with H7 on the right.

Input message bit length 574 is in, e.g., byte offsets 32-39 of parameter block 570. In one example, input message bit length 574 in parameter block 570 includes the bit length of the total input message to be hashed.

Encrypted cryptographic key (K) 576 is in, e.g., byte offsets 40-103 of parameter block 570. It is a cryptographic key that has been encrypted.

AES wrapping key verification pattern 578 is in, e.g., byte offsets 104-135 of parameter block 570 and is used to verify the encrypted cryptographic key, in one example.

The parameter block may include additional, fewer and/or other information. Other examples and variations are possible.

For the Compute Message Authentication Code-Hash-Based Message Authentication Code (KMAC-HMAC)-Encrypted-SHA-224 and Compute Message Authentication Code-Hash-Based Message Authentication Code (KMAC-HMAC)-Encrypted-SHA-256 functions, the contents of byte offsets 104-135 of the parameter block (AES wrapping key verification pattern 578) are compared with the contents of an AES wrapping-key-verification-pattern register. If they mismatch, the parameter block location remains unchanged, and the operation is completed by setting, e.g., condition code 1. If they match, byte offsets 0-31 of the parameter block contain the chaining value (called H fields), byte offsets 32-39 of the parameter block contain the input message bit length (IMBL), and the contents of byte offsets 40-103 of the parameter block are deciphered using the AES wrapping key to obtain the 512-bit cryptographic key (K).

In operation, a function specified by the function code in general register 0 is performed. As examples herein, the function is a hash-based message authentication code function, such as a Compute Message Authentication Code-Hash-Based Message Authentication Code-SHA2-224/256 function or a Compute Message Authentication Code-Hash-Based Message Authentication Code-Encrypted-SHA-224/256 function. Additional, fewer and/or other functions are also possible including, but not limited to SHA-384 and SHA-512 functions, as well as other functions and/or different functions than described herein. Many examples are possible.

In one example, for the hash-based message authentication code functions, the inner-key padding and hashing operation is performed if the inner-key padding flag is, e.g., zero, and the full input message blocks based on the second operand length are processed. If the intermediate input message part flag is, e.g., zero, the SHA padding and hashing operation is performed on the last (partial or empty) input message block, the output chaining value (OCV) is saved, the outer-key padding and hashing operation is performed, the SHA padding and hashing operation is performed on the saved output chaining value, and the result is stored into the chaining value (CV) field of the parameter block. The operation completes with either a selected condition code (e.g., condition code 0 (normal completion)) or a specified condition code (e.g., condition code 3 (partial completion)), as examples.

For the hash-based message authentication code functions, the result is obtained as if processing starts at the inner-key padding and hashing operation followed by the hashing of the input message blocks based on second operand length from, e.g., left to right, and if the intermediate input message part flag is, e.g., zero, then continuing with the input message padding and hashing operation followed by the outer-key padding and hashing operation and then ending with the output message padding and hashing operation. The authentication operation is ended when the source bytes (e.g., all source bytes) in the second operand have been processed if the intermediate input message part flag is, e.g., one or when the output message padding and hashing operation has been processed if the intermediate input message part flag is, e.g., zero, or when a central processing unit (CPU)-determined number of blocks that is less than the number of blocks of the entire process have been processed.

The CPU-determined number of blocks depends, for instance, on the model, and may be a different number each time the instruction is executed. The CPU-determined number of blocks is usually, e.g., nonzero. In certain unusual situations, this number may be, e.g., zero, and a specified condition code (e.g., condition code 3) may be set with no progress. However, the central processing unit protects against endless reoccurrence of this no-progress case.

For the hash-based message authentication code functions, if the central processing unit is enabled to update counters in the cryptography counter set and the appropriate cryptography counter is accessible, then subsequent to performing the inner-key padding and hashing operation and processing the bytes (e.g., all bytes) of the second operand followed by the input message block padding and hashing operation, the outer-key padding and hashing operation, and the output message block padding and hashing operation if the intermediate input message part flag is, e.g., zero, the appropriate cryptography counter is updated.

In one example, when the initial chaining value field overlaps any portion of the second operand, the result in the chaining value field is unpredictable. Normal completion occurs when the authentication operation has ended and, when applicable, a counter in the cryptography counter set has been updated. Partial completion occurs when a CPU-determined number of blocks that is less than the length of the second operand have been processed or when the central processing unit is enabled to update a counter in the cryptography counter set and the appropriate cryptography counter has not yet been updated.

For the hash-based message authentication code functions, when the operation ends due to normal completion, a selected condition code (e.g., condition code 0) is set, the inner-key padding flag is set to, e.g., one, the value in $R_2+1$ is set to, e.g., zero, and the cryptography counter update pending flag is set to, e.g., zero. When the operation ends due to partial completion, a specified condition code (e.g., condition code 3) is set. In this case, if the central processing unit is enabled to update counters in the cryptography counter set, the inner-key padding and hashing operation has been performed, the second operand (e.g., all of the second operand) has been processed, the input message block padding and hashing operation has been performed, the outer-key padding and hashing operation has been performed, the output message block padding and hashing operation has been performed, and the appropriate counter is not accessible, then the inner-key padding flag is set to, e.g., one, the resulting value placed in general register $R_2+1$ is, e.g., zero, and the cryptography counter update pending flag is set to, e.g., one; otherwise the inner-key padding flag is set to, e.g., one if the inner-key padding and hashing operation has been performed, the resulting value placed in general register $R_2+1$ is, e.g., nonzero if the second operand (e.g., all of the second operand) has not been processed, or the resulting value placed in general register $R_2$+1 is, e.g., zero if the second operand (e.g., all of the second operand) has been processed.

For the hash-based message authentication code functions, when the second operand length is, e.g., initially zero, the following occurs, in one example: the second operand is not accessed, the parameter block is not accessed if the intermediate input message part flag is, e.g., one, and general registers $R_2$ and $R_2$+1 are not changed. The inner-key padding and hashing operation is performed if the inner-key padding flag is, e.g., zero. If the intermediate input message part flag is, e.g., zero and the cryptography counter update pending flag is, e.g., zero, the empty input message block SHA padding and hashing operation is performed followed by the outer-key padding and hashing operation and the final SHA padding and hashing operation and the result is stored into the chaining value (CV) field of the parameter block. If the central processing unit is not enabled to update counters in the cryptography counter set, then a selected condition code (e.g., condition code 0) is set and the cryptography counter update pending flag is set to, e.g., zero. If the central processing unit is enabled to update counters in the cryptography counter set, and the appropriate counter is accessible, then the appropriate cryptography counter is updated, the selected condition code (e.g., condition code 0) is set, and the cryptography counter update pending flag is set to, e.g., zero. If the central processing unit is enabled to update counters in the cryptography counter set and the appropriate counter is not accessible, then the specified condition code (e.g., condition code 3) is set and the cryptography counter update pending flag is set to, e.g., one if the cryptography counter update pending flag is, e.g., zero, or the condition code remains unchanged and an access exception is recognized for the location of the appropriate cryptography counter if the cryptography counter update pending flag is, e.g., one.

In one example, a program event recording (PER) storage-alteration event may be recognized for the portion of the parameter block that is stored. A PER zero-address-detection event may be recognized for the second operand location and for the parameter block. For the hash-based message authentication code functions, a PER zero-address-detection event may be recognized for the parameter block even when the second operand length is zero. When PER events are detected for more than one location, it is unpredictable which location is identified in the PER access identification (PAID) and PER ASCE ID (AI).

As observed by this central processing unit, other central processing units, and channel programs, references to the parameter block and storage operand may be multiple-access references, accesses to these storage locations are not necessarily block-concurrent, and the sequence of these accesses or references is undefined.

For functions that perform a comparison of the wrapping key verification pattern field in the parameter block with the wrapping key verification pattern register, it is unpredictable whether access exceptions and PER-zero-address-detection events are recognized for the second operand when the comparison results in a mismatch. For the hash-based message authentication code functions, the entire parameter block may be tested for store-type accesses even though part of it may not be stored.

In one or more aspects, access exceptions may be reported for a larger portion of the second operand than is processed in a single execution of the instruction; however, access exceptions are not recognized for locations beyond the length of the second operand nor for locations more than 4K bytes beyond the current location being processed.

In one example, when the inner-key padding flag is, e.g., zero (indicating that the inner-key padding and hashing operation has not been performed), the $H^{(0)}$ value of the SHA-224 block digest algorithm is used as the initial chaining value for the Compute Message Authentication Code-Hash-based Message Authentication Code-SHA-224 function and the Compute Message Authentication Code-Hash-based Message Authentication Code-Encrypted SHA-224 function, whereas the $H^{(0)}$ value of the SHA-256 block digest algorithm is used as the initial chaining value for the Compute Message Authentication Code-Hash-based Message Authentication Code-SHA-256 function and the Compute Message Authentication Code-Hash-based Message Authentication Code-Encrypted SHA-226 function.

When the inner-key padding flag is, e.g., zero (indicating that the inner-key padding and hashing operation has not been performed), $H^{(0)}$ is used (instead of the chaining value from the parameter block) as input to perform the inner-key padding and hashing operation. When the inner-key padding flag is, e.g., one (indicating that the inner-key padding and hashing operation has been performed), the inner-key padding and hashing operation is not performed.

Figure 6A:
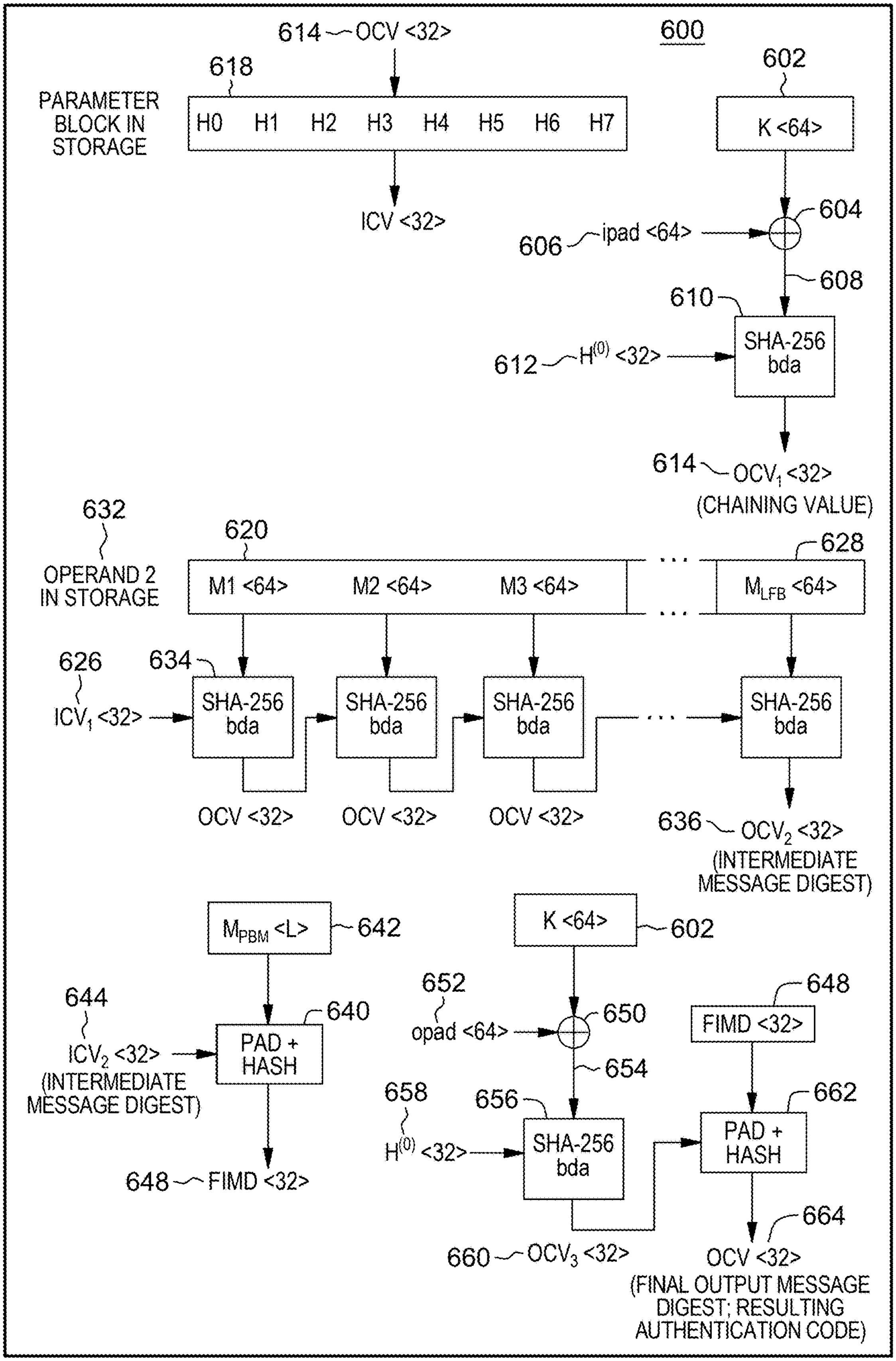
FIG. 6A depicts one example of operations of hash-based message authentication code processing, in accordance with one or more aspects of the present disclosure.

In one example, when the inner-key padding flag is, e.g., zero (indicating that an inner-key padding and hashing operation has not yet been performed), an inner-key padding and hashing operation is performed. In one example, referring to FIG. 6A, to perform an inner-key padding and hashing operation (also referred to herein as Part 1), the 512-bit (64-byte) cryptographic key (K) 602 obtained, e.g., from the parameter block is exclusive-ORed 604 with an inner pad (ipad) 606 (e.g., 64 bytes of 36 hex) to produce a 64-byte inner-key 608. A 32-byte chaining value 1 ($CV_1$) 614 is generated for the 64-byte inner-key 608 using the SHA-256 block digest algorithm (bda) 610 with the 32-byte $H^{(0)}$ value 612 and the inner-key padding flag is set to, e.g., one. The generated chaining value 1 ($OCV_1$) 614, also called the output chaining value (OCV), is stored into the chaining value (CV) field of a parameter block 618. If the operation ends due to partial completion, a specified condition code (e.g., condition code 3) is set.

In one example, a 32-byte intermediate message digest (IMD) 636 is generated for the 64-byte full input message blocks (M1, M2, . . . , Mn) 620 in operand2 632 using the SHA-256 block digest algorithm 634 with the 32-byte chaining value ($ICV_1$) 626 from the parameter block. If the intermediate input message part flag is, e.g., one or L is, e.g., zero, $M_{LFB}$ 628 is the last input message block (Mn); otherwise, $M_{LFB}$ is the input message block that immediately precedes the last (partial) input message block (Mn−1). The generated intermediate message digest ($OCV_2$) 636, also called the output chaining value (OCV), is stored into the chaining value (CV) field of parameter block 618. This operation (also referred to herein as Part 2) repeats until the remaining input message is less than, e.g., 64 bytes or until a CPU-determined number of blocks have been stored. If the operation ends due to partial completion, a specified condition code (e.g., condition code 3) is set.

In one example, when the intermediate input message part flag is, e.g., one (indicating operand 2 includes the intermediate input message part), the following occurs, in one example: If the central processing unit is not enabled to update counters in the cryptography counter set, then a selected condition code (e.g., condition code 0) is set (indicating normal completion) and the cryptography counter update pending flag is set to, e.g., zero. If the central processing unit is enabled to update counters in the cryptography counter set and the appropriate counter is accessible, then the appropriate counter is updated, a selected condition code (e.g., condition code 0) is set (indicating normal completion), and the cryptography counter update pending flag is set to, e.g., zero. If the central processing unit is enabled to update counters in the cryptography counter set and the appropriate counter is not accessible, then a specified condition code (e.g., condition code 3) is set and the cryptography counter update pending flag is set to, e.g., one if the cryptography counter update pending flag is, e.g., zero, or the condition code remains unchanged and an access exception is recognized for the location of the appropriate cryptography counter if the cryptography counter update pending flag is, e.g., one.

When the intermediate input message part flag is, e.g., zero (indicating operand 2 includes the last input message part) and the operation ends due to partial completion, a specified condition code (e.g., condition code 3) is set.

The description in the following paragraphs apply to the functions when the intermediate input message part flag is, e.g., zero (indicating operand 2 includes the last input message part):

If the cryptography counter update pending flag is, e.g., one, the input message padding and hashing (also referred to herein as Part 3), the outer-key padding and hashing (also referred to herein as Part 4), and the output message padding and hashing operations (also referred to herein as Part 5) are not performed. Instead, in one example, only the appropriate counter in the cryptography counter set is updated, assuming the counter is accessible.

After the full input message blocks of operand 2 (e.g., all the full blocks) have been processed, an input message padding and hashing operation (Part 3) is performed. For instance, the input message bit length is updated to include the input key bit length by, e.g., adding 512 (input key bit length) to the input message bit length and any carry is ignored. Then, a padding operation 640 is performed on a final message block of the message 642 (e.g., either on the last (partial) input message block or on a null block (MPBM) in operand 2 (based on the calculated L value)) using the input message bit length in byte offsets 32-39 of the parameter block to produce the padded input message block. Next, a hashing operation 640 is performed on the padded input message block, and a final input message digest (FIMD) 648 is generated using the SHA-256 block digest algorithm with the 32-byte chaining value ($ICV_2$; e.g., the intermediate message digest) 644 from the parameter block.

In one example, the padding and hashing operation of the input message is performed as described with reference to FIGS. 6B-6D. For instance, if the length of the partial message block length (L) is, e.g., zero bytes, then the operation in FIG. 6B is performed; if the length of the partial message block length (L) is, e.g., between one byte and 55 bytes inclusive, then the operation in FIG. 6C is performed; and if the length of the partial message block length (L) is, e.g., between 56 bytes and 63 bytes inclusive, then the operation in FIG. 6D is performed.

Figure 6B:
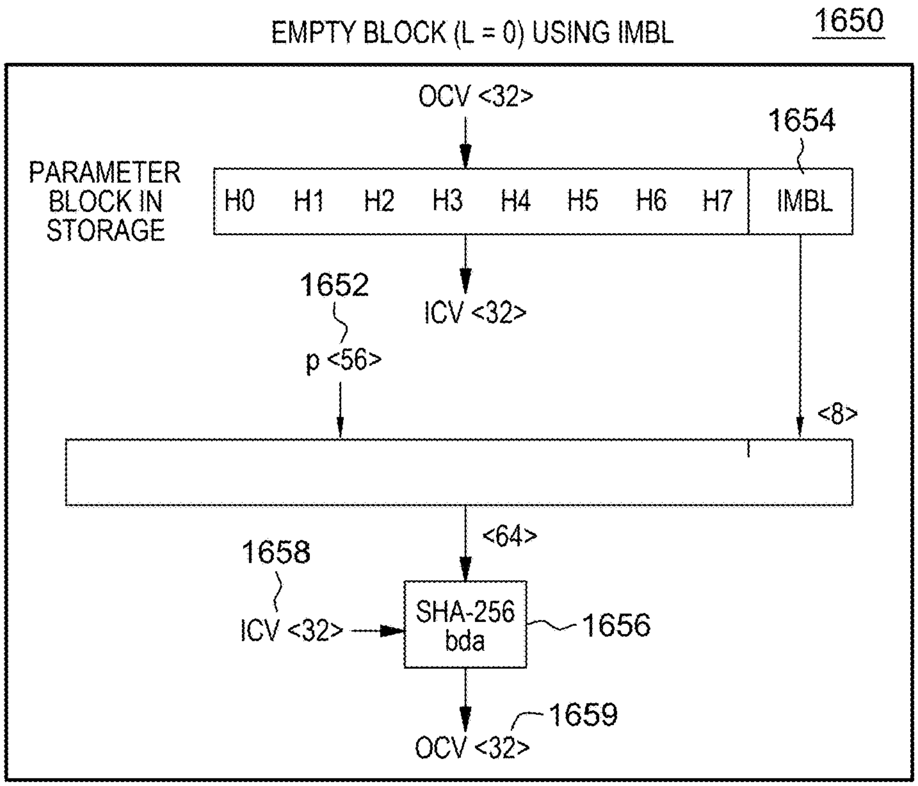
FIG. 6B depicts one example of operations of hash-based message authentication code processing for an empty block using a selected input message bit length, in accordance with one or more aspects of the present disclosure.

Referring to FIG. 6B, a padding and hashing operation 1650 includes concatenating padding bytes 1652 (e.g., 56 padding bytes, in which the leftmost byte is 80 hex, other byes are 00 hex) to an 8-byte value specifying a bit length of the total input message (IMBL) 1654, a result of which is input to a block digest algorithm 1656 (e.g., a SHA-256 bda). Using block digest algorithm 1656 and a 32-byte input chaining value 1658 a 32-byte output chaining value 1659 is generated.

Figure 6C:
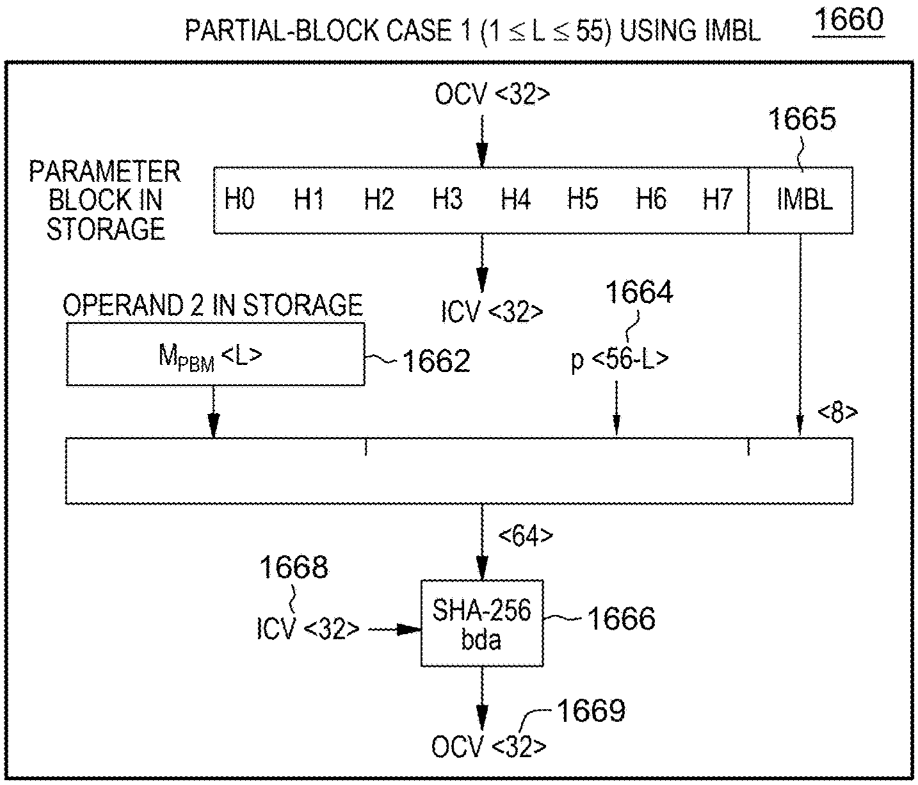
FIG. 6C depicts one example of operations of hash-based message authentication code processing for a partial block using another selected input message bit length, in accordance with one or more aspects of the present disclosure.

Referring to FIG. 6C, a padding and hashing operation 1660 includes concatenating a value specifying a length 1662 of the MPBM in operand 2 and padding bytes 1664 (e.g., 56-L padding bytes, in which the leftmost byte is 80 hex, other byes are 00 hex) to an 8-byte value specifying a bit length of the total input message (IMBL) 1665, a result of which is input to a block digest algorithm 1666 (e.g., a SHA-256 bda). Using block digest algorithm 1666 and a 32-byte input chaining value 1668 a 32-byte output chaining value 1669 is generated.

Figure 6D:
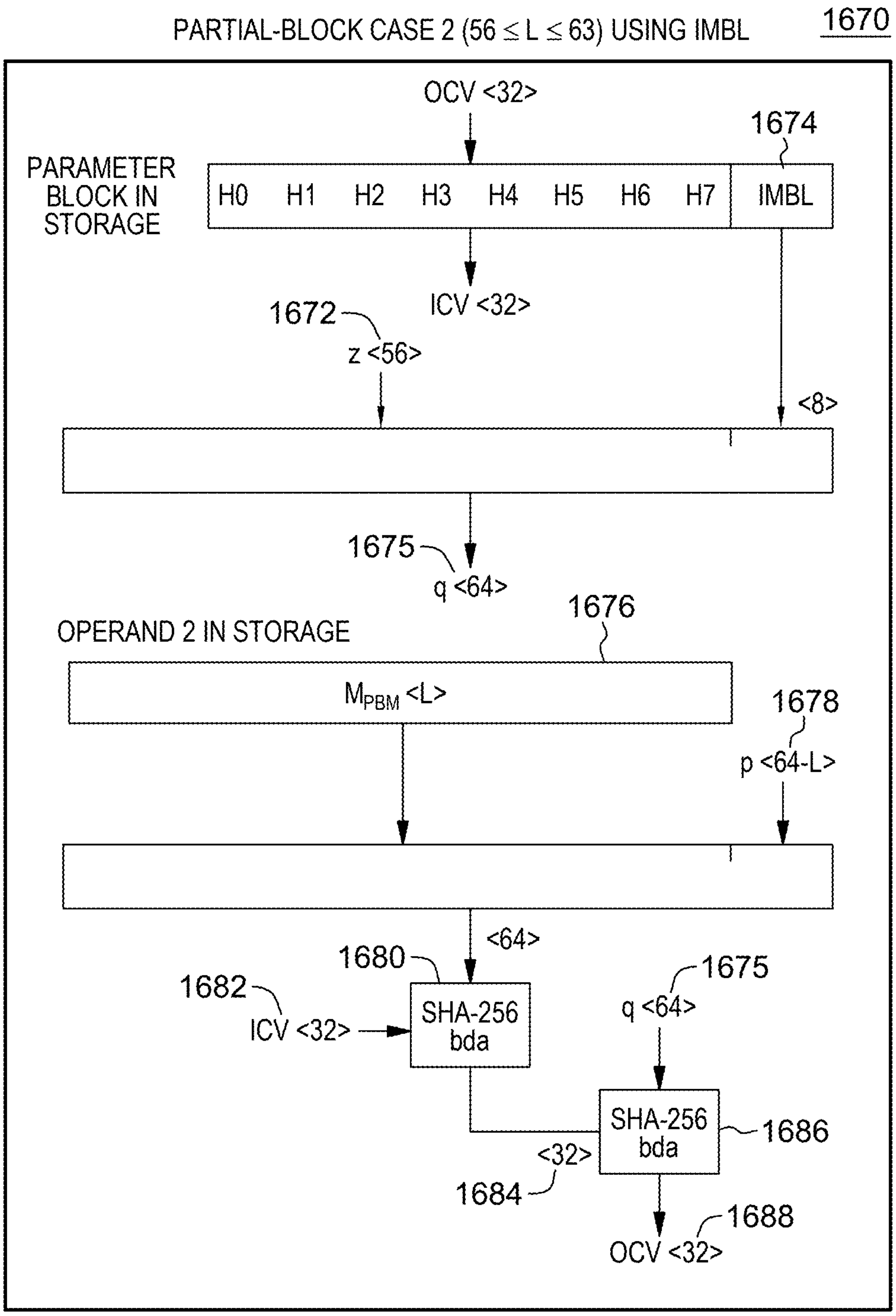
FIG. 6D depicts another example of operations of hash-based message authentication code processing for a partial block using a particular input message bit length, in accordance with one or more aspects of the present disclosure.

Referring to FIG. 6D, a padding and hashing operation 1670 includes concatenating padding bytes 1672 (e.g., 56 padding bytes of zero) to an 8-byte value specifying a bit length of the total input message (IMBL) 1674, a result of which is a padding block 1675 that includes, e.g., 56 bytes of, e.g., zero followed by an 8-byte IMBL. Further, a value specifying a length 1676 of the MPBM in operand 2 is concatenated with padding bytes 1678 (e.g., 64-L padding bytes, in which, the leftmost byte, in one example is, e.g., 80 hex and the other bytes are, e.g., 00 hex) to produce a 64-byte result that is input to a block digest algorithm 1680 (e.g., a SHA-256 bda). Using block digest algorithm 1680 and a 32-byte input chaining value 1682 a 32-byte result 1684 is generated. Result 1684 and padding block 1675 are input to a block digest algorithm 1686 (e.g., a SHA-256 bda) to generate a 32-byte output changing value 1688.

Returning to FIG. 6A, in one example, an outer-key padding and hashing operation (Part 4) is performed. For instance, the 512-bit (64-byte) cryptographic key (K) 602 is exclusive-ORed 650 with the outer pad (opad) 652 (e.g., 64 bytes of 36 hex) to produce the 64-byte outer-key 654. A 32-byte chaining value 3 ($OCV_3$) 660 is generated for the 64-byte outer-key 654 using the SHA-256 block digest algorithm 656 with the 32-byte $H^{(0)}$ value 658.

After the chaining value 3 ($OCV_3$) 660 is generated, an output message padding and hashing operation (Part 5) is performed. For instance, a padding operation 662 is performed on the final input message digest (FIMD) 648, also called the (partial) output message block ($M_{PMB}$), using the final input message digest (FIMD) bit length to produce the padded output message block. For Compute Message Authentication Code-Hash-based Message Authentication Code-SHA-224 and Compute Message Authentication Code-Hash-based Message Authentication Code-Encrypted-SHA-224 functions, the leftmost 28 bytes of the final input message digest (FIMD) is used as the (partial) output message block ($M_{PMB}$), L is set to, e.g., 28, and the output message bit length is set to, e.g., 736. For Compute Message Authentication Code hash-based message authentication code-SHA-256 and Compute Message Authentication Code-hash-based message authentication code-Encrypted-SHA-256 functions, the entire final input message digest (FIMD) is used as the (partial) output message block ($M_{PMB}$), L is set to 32, and the output message bit length is set to, e.g., 768.

Next, a final hashing operation 662 is performed on the padded output message block and the final output message digest (OCV) 664 (also referred to as the resulting authentication code) is generated using the SHA-256 block digest algorithm with, e.g., the 32-byte chaining value 3 ($OCV_3$) 660. The entire final output message digest (OCV) 664 is stored into the chaining value (CV) field of the parameter block.

Figure 6E:
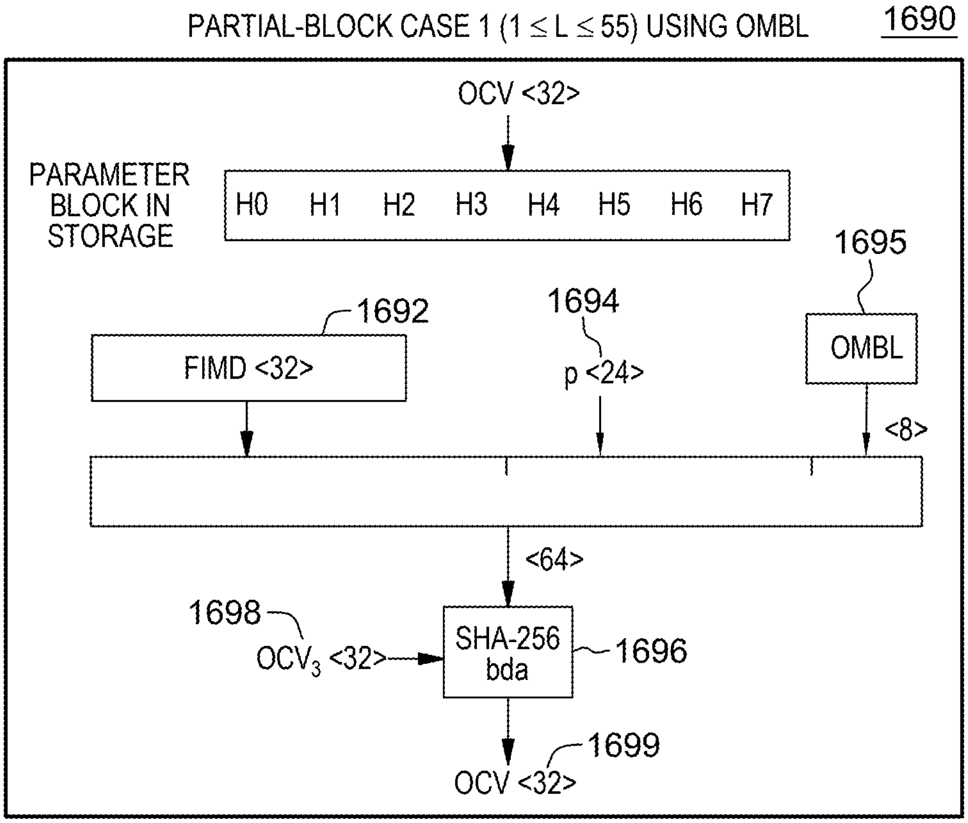
FIG. 6E depicts another example of operations of hash-based message authentication code processing for a partial block using a selected output message bit length, in accordance with one or more aspects of the present disclosure.

The final padding and hashing operation of the output message is further described with reference to FIG. 6E. In one example, a padding and hashing operation 1690 includes concatenating FIMD 1692 and padding bytes 1694 (e.g., 24 padding bytes, in which the leftmost byte is 80 hex, other bytes are 00 hex) to an 8-byte value specifying a bit length of the total output message (OMBL) 1695, a result of which is input to a block digest algorithm 1696 (e.g., a SHA-256 bda). Using block digest algorithm 1696 and a 32-byte output chaining value ($OCV_3$) 1698 a 32-byte output chaining value 1699 is generated.

Although in the example herein, certain byte sizes are described, other byte sizes may be used in other examples. Further, other size SHA block digest algorithms may be used, as well as other hash or hash-based techniques. Many examples are possible.

In one example, when the intermediate input message part flag is, e.g., zero (indicating the last input message part), the following occurs, in one example: If the central processing unit is not enabled to update counters in the cryptography counter set, then a selected condition code (e.g., condition code 0) is set (indicating normal completion) and the cryptography counter update pending flag is set to, e.g., zero. If the central processing unit is enabled to update counters in the cryptography counter set and the appropriate counter is accessible, then the appropriate counter is updated, a selected condition code (e.g., condition code 0) is set (indicating normal completion), and the cryptography counter update pending flag is set to, e.g., zero. If the central processing unit is enabled to update counters in the cryptography counter set and the appropriate counter is not accessible, then a specified condition code (e.g., condition code 3) is set and the cryptography counter update pending flag is set to, e.g., one if the cryptography counter update pending flag is, e.g., zero, or the condition code remains unchanged and an access exception is recognized for the location of the appropriate cryptography counter if the cryptography counter update pending flag is, e.g., one.

In one example, a specification exception is recognized and no other action is taken if any of the following occurs:

Bit 56 of general register 0 is not zero.

Bits 57-63 of general register 0 specify an unassigned or uninstalled function code.

The $R_2$ field designates an odd-numbered register or general register 0.

The second operand length is not a multiple of the data block size when the designated function is either not a hash-based message authentication code function (e.g., function codes 112-115 and 120-123) or it is a hash-based message authentication code function but the intermediate input message part flag is, e.g., one.

When a hash-based message authentication code function is specified and the intermediate input message part flag is, e.g., one and the inner-key padding flag is, e.g., zero and the second operand length is, e.g., zero.

Example resulting condition codes include, for instance: 0 Normal completion; 1 Verification-pattern mismatch; 2—; 3 Partial completion.

Example program exceptions include, for instance:

Access (fetch, operand 2, cryptographic key, input-message-bit length (IMBL), and wrapping-key verification pattern; fetch and store, chaining value, cryptography counter)

Operation (if the message-security assist is not installed)

Specification

Transaction constraint

One example of execution priority is indicated below:

1.-6. Exceptions with the same priority as the priority of program-interruption conditions for the general case.

7.A Access exceptions for second instruction halfword.

7.B Operation exception.

7.C Transaction constraint

8. Specification exception due to invalid function code or invalid register number.

9. Specification exception due to invalid operand length.

10 Access exceptions for an access to a cryptography counter and second operand length originally zero and the designated function is not a hash-based message authentication code function.

11 Condition code 0 (normal completion) due to second operand length originally zero and the designated function is not a hash-based message authentication code function.

12.A.1.A Access exceptions for an access to the entire parameter block when the designated function is a hash-based message authentication code function.

12.A.1.B Access exceptions for an access to the parameter block when the designated function is not a hash-based message authentication code function.

12.A.2. Condition code 1 due to verification pattern mismatch.

12.A.3.A. Condition code 3 due to the second operand length is not originally zero and the designated function is a hash-based message authentication code function and the cryptography counter update pending flag is one.

12.A.3.B. Condition code 3 due to the second operand length is originally zero and the designated function is a hash-based message authentication code function and the intermediate input message part flag is zero and the inner-key padding flag is originally zero and the cryptography counter update pending flag is one.

12.A.4. Condition code 3 due to the second operand length is originally zero and the designated function is a hash-based message authentication code function and the intermediate input message part flag is one and the inner-key padding flag is one and access exception condition is detected for an access to a cryptography counter.

12.A.5. Access exceptions for an access to a cryptography counter and the second operand length originally zero and the designated function is a hash-based message authentication code function and the intermediate input message part flag is one and the inner-key padding flag is one.

12.A.6. Condition code 0 (normal completion) due to the second operand length is originally zero and the designated function is a hash-based message authentication code function and the intermediate input message part flag is one and the inner-key padding flag is one.

12.B Access exceptions for an access to the parameter block when the designated function is not a hash-based message authentication code function or second operand storage area.

13. Condition code 3 due to partial completion (second operand length still nonzero).

14.A. Condition code 3 due to second operand length stepped to zero and the designated function is either not a hash-based message authentication code function, or it is a hash-based message authentication code function and the intermediate input message part flag is one, and access-exception condition detected for an access to a cryptography counter.

14.B. Condition code 3 due to the second operand length stepped to zero and the designated function is a hash-based message authentication code function and the intermediate input message part flag is zero and the outer-key padding and hashing operation is performed and access exception condition is detected for an access to a cryptography counter.

14.C. Condition code 3 due to the second operand length originally zero and the designated function is a hash-based message authentication code function and the intermediate input message part flag is zero and the cryptography counter update pending flag is originally zero and the outer-key padding and hashing operation is performed and access exception condition is detected for an access to a cryptography counter.

15.A. Access exceptions for an access to a cryptography counter and the second operand length stepped to zero and the designated function is either not a hash-based message authentication code function, or it is a hash-based message authentication code function and the intermediate input message part flag is one.

15.B. Access exceptions for an access to a cryptography counter and the second operand length stepped to zero and the designated function is a hash-based message authentication code function and the intermediate input message part flag is zero and the outer-key padding and hashing operation is performed.

15.C. Access exceptions for an access to a cryptography counter and the second operand length originally zero and the designated function is a hash-based message authentication code function and the intermediate input message part flag is zero and the cryptography counter update pending flag is originally one.

16.A. Condition code 0 (normal completion) due to the second operand length stepped to zero and the designated function is either not a hash-based message authentication code function, or it is a hash-based message authentication code function and the intermediate-input-message part flag is one and access exception condition is not detected for an access to a cryptography counter.

16.B. Condition code 0 (normal completion) due to the second operand length stepped to zero and the designated function is a hash-based message authentication code function and the intermediate input message part flag is zero and the outer-key padding and hashing operation is performed and access exception condition is not detected for an access to a cryptography counter.

16.C. Condition code 0 (normal completion) due to the second operand length originally zero and the designated function is a hash-based message authentication code function and the intermediate input message part flag is zero and the cryptography counter update pending flag is originally one and access exception condition is not detected for an access to a cryptography counter.

In one or more aspects, when condition code 3 is set, the second operand address and length in general registers $R_2$ and $R_2+1$, respectively, and the initial chaining value in the parameter block are usually updated such that the program can simply branch back to the instruction to continue the operation. For unusual situations, the central processing unit protects against endless reoccurrence for the no-progress case. Thus, the program can safely branch back to the instruction whenever condition code 3 is set with no exposure to an endless loop.

In one or more aspects, if the length of the second operand is nonzero initially and condition code 0 is set, the registers are updated in the same manner as for condition code 3; the initial chaining value in this case is such that additional operands can be processed as if they were part of the same chain.

In one or more aspects, before processing the first part of a message, the program is to set the initial values for the initial chaining value field. To comply with, e.g., ANSI X9.9 or ANSI X9.19, the initial chaining value shall be set to, e.g., all binary zeros.

In one or more aspects, the following applies to the input message bit length in the parameter block of the hash-based message authentication code functions, as examples:

The program supplied input message bit length value includes only the bit length of the entire input message. The hash-based message authentication code function adds the bit length of the input key to the input message bit length when performing the input message padding and hashing operation.

The input message bit length is completely independent of the second operand length in general register $R_2+1$.

Regardless of whether the instruction ends with condition code 0 or 3, the input message bit length is not decremented by the number of bytes processed.

In normal usage, the input message bit length is expected to be eight times the total size of the input message in bytes. If the program supplies an input message bit length that is not a multiple of eight, the results will be algorithmically correct, but may not be usable in any practical application.

One example of a secure hash algorithm allows for input message bit lengths that are not multiples of eight. The cryptography counter update pending functions use input message bit lengths of a multiple of eight.

Other examples and/or variations are possible.

In one example, when computing a message digest, the program may not initially be aware of the total message bit length; for example, for a message being read from an I/O device, the message bit length may not be known until the final block is read. When computing a message digest for a message whose length is not known, or for a message where it is known that the last message block is not included in the calculation, a hash-based message authentication code function with intermediate input message part flag set to, e.g., one may be used. When computing a message digest for a message that includes the last block, a hash-based message authentication code function with intermediate input message part flag set to, e.g., zero is to be used.

In one example, the output chaining value is the output of the SHA block digest algorithm, which is stored into the chaining value of the parameter block.

In the description herein of a compute message authentication code instruction, such as Compute Message Authentication Code instruction 500, specific locations, specific fields and/or specific sizes of the fields may be indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

In one embodiment, the fields of the instruction are separate and independent from one another; however, in other embodiments, more than one field may be combined. Further, although example types of registers are used, other types of registers may be used. Other examples are possible.

An instruction, such as a Compute Message Authentication Code instruction, may have additional, fewer and/or other fields. For instance, one or more fields of a message instruction, such as the Compute Message Authentication Code instruction, may be optional. Many variations are possible.

Although various examples are provided for one or more formats of the instruction, additional and/or other formats may be used. Further, the processing may be used for other purposes than described herein.

Further details of processor activity instrumentation processing are described with reference to FIGS. 7A-7B and FIG. 8. In one example, a processor activity instrumentation (PAI) facility provides a mechanism to count specific processor activities during program execution. This enables clients to ensure programs are using the most secure algorithms to meet compliance regulations. The processor activity instrumentation facility provides a set of counters that is maintained in a block of storage at a location specified by a program authorized to store into a selected storage location, such as the prefix area. As used herein, storage, storage location, block of storage, etc. may be an area in memory or storage. It is, for instance, any selected area used to store a counter, etc.

The facility provides, for instance, a single set of counters, called the cryptography counter set. The cryptography counter set is controlled by the processor instrumentation activity facility and the cryptography counter set storage is controlled by, e.g., a control program, such as an operating system. Each counter in the set is referred to as an instrumentation counter, such as a processor activity instrumentation counter (or a cryptography counter, etc.) and there is one counter for each cryptographic function of selected cryptographic functions. Each counter is located at a specific offset within, e.g., a 2 K-byte block of storage called the cryptography counter block. The location of the cryptography counter block is specified by the contents of real storage locations, e.g., 5376-5383 (1500-1507 hex), which includes, for example, a cryptography counter block origin.

In one example, bits 0-52 of the doubleword at, e.g., real location 5376 (e.g., 1500 hex), with, e.g., 11 zeros appended on the right, form a 64-bit real address that designates the leftmost byte of the 2 K-byte cryptographic counter block. Bits 53-63 of the doubleword at, e.g., real location 5376 (e.g., 1500 hex) are reserved and should be zeros to ensure future compatibility. The cryptography counter block is referenced by the processor activity instrumentation facility when, e.g., the leftmost byte of the block is located at or above, e.g., the 32 K-byte real-address boundary.

One example of a cryptography counter block is described with reference to FIG. 7A. In one example, a cryptography counter block 700 includes:

Header 702, which is, e.g., 8 bytes starting at, e.g., offset 0 that are available for use by programming. The header is not modified during the process of updating a counter in the cryptography counter set; and Cryptography Counter Number N 704: In one example, the 8 bytes starting at, e.g., offset 8×N contain the current value of cryptography counter number N.

Example cryptography counter numbers and associated processor activities are described with reference to FIG. 7B. In one example, there is a cryptography counter number 704 and a processor activity counter name 722 for each of the following processor activities:

161 KMAC-HMAC-SHA-224 function ending with CC=0

162 KMAC-HMAC-SHA-256 function ending with CC=0

163 KMAC-HMAC-SHA-384 function ending with CC=0

164 KMAC-HMAC-SHA-512 function ending with CC=0

165 KMAC-HMAC-Encrypted-SHA-224 function ending with CC=0

166 KMAC-HMAC-Encrypted-SHA-256 function ending with CC=0

167 KMAC-HMAC-Encrypted-SHA-384 function ending with CC=0

168 KMAC-HMAC-Encrypted-SHA-512 function ending with CC=0

Additional, fewer and/or other counter numbers, processor activity counter names and/or associated processor activities may be counted. Many examples are possible. In one example, the bytes at, e.g., offsets 1256-2047 are reserved for possible future extensions. Reserved bytes are not modified, in one example, during the process of updating a counter in the cryptography counter set.

In one example, the central processing unit is enabled to update counters in the cryptography counter set when, for instance, a processor activity instrumentation facility is installed, bit 13 (as an example) of control register 0 is, e.g., one, and the contents of the doubleword at, e.g., real location 5376 (1500 hex) are greater than, e.g., 32767 (7FFF hex). Other examples are possible.

Further details of processor activity instrumentation processing are described with reference to FIG. 8. This figure refers to parts of processing of, for instance, a hash-based message authentication code algorithm. In one example, the hash-based message authentication code algorithm is a complex algorithm with multiple distinct parts. For instance, in one example, the hash-based message authentication code algorithm includes Part 1—inner-key padding and hashing operation (see, e.g., 602-614 of FIG. 6A); Part 2—full-input message blocks hashing operation (see, e.g., 626-636 of FIG. 6A); Part 3—partial/null input message block padding and hashing operation (see, e.g., 642-648 of FIG. 6A); Part 4—outer-key padding and hashing operation (see, e.g., 602-660 of FIG. 6A); Part 5—partial output message block padding and hashing operation (see, e.g., 648-664 of FIG. 6A); and Part 6—update processor activity instrumentation operation, in accordance with one or more aspects of the present disclosure. FIG. 8, in one example, depicts selected parts of the processing and selected aspects of those parts for clarity in describing one or more aspects of the present disclosure. Other parts and/or other aspects of one or more parts may use a processor instrumentation activity counter facility, a processor instrumentation activity counter and/or a cryptography counter update pending indicator, in accordance with one or more aspects. Many examples and variations are possible.

Figure 8:
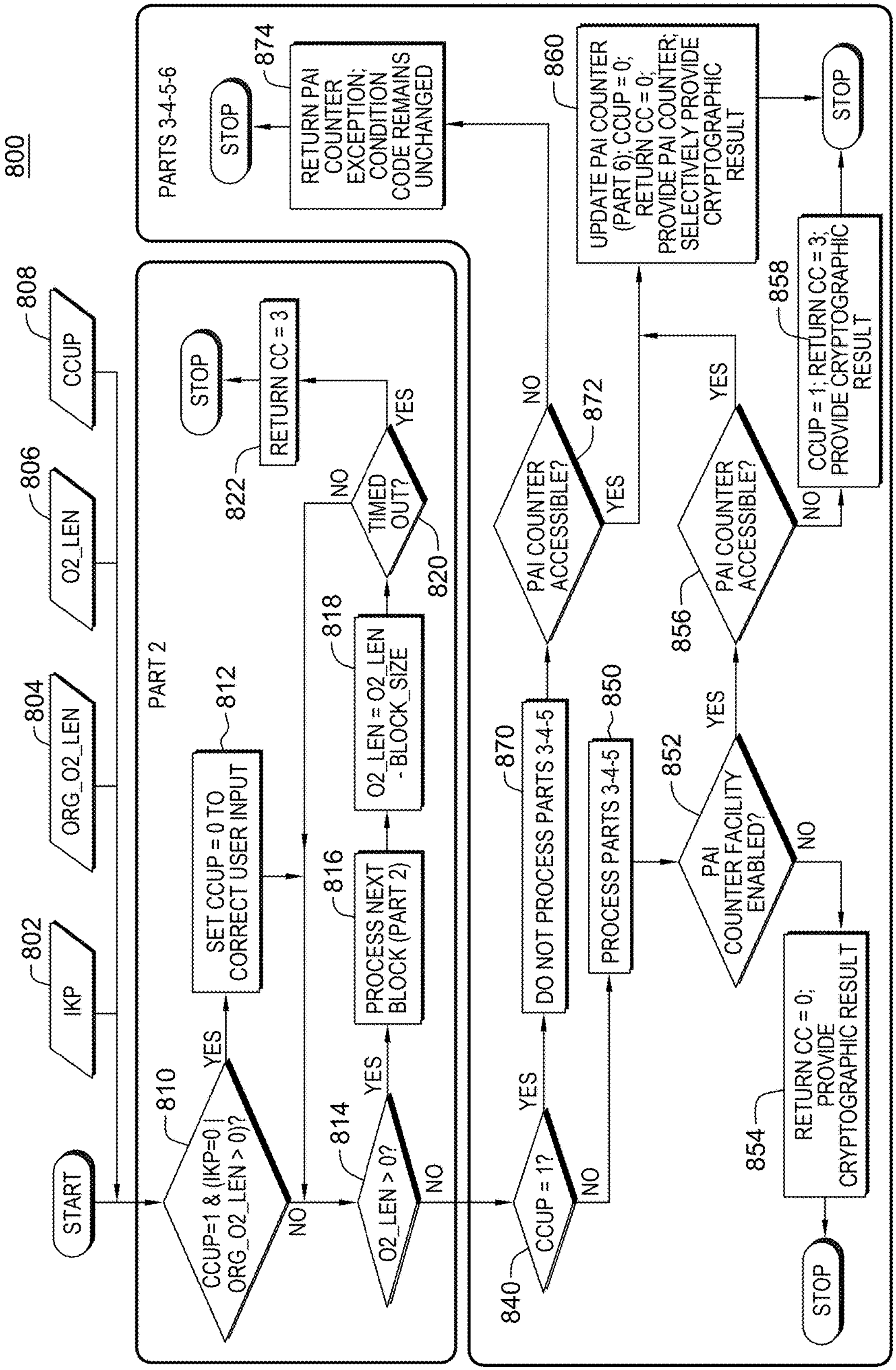
FIG. 8 depicts one example of a processor activity instrumentation processing code process, in accordance with one or more aspects of the present disclosure.

Referring to FIG. 8, in one example, a processor activity instrumentation process 800 (also referred to as process 800) is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; one or more hardware accelerators separate and/or part of one or more processors and/or processing circuitry; and/or other computing devices, etc.). Additional and/or other computers, servers, devices, processors, nodes, processing circuitry, accelerators, and/or computing devices may be used to execute the processing and/or aspects thereof. Many examples are possible.

In one example, processor activity instrumentation process 800 is to execute an instruction (e.g., a Compute Message Authentication Code instruction) using, e.g., execute instruction code 410. In one example, the processing is performed based on the intermediate input message part being set to, e.g., zero. Similar processing may be performed based on the intermediate input message part being set to, e.g., one. In one example, process 800 obtains from the instruction (e.g., using obtain operands code 412) as input an inner-key padding (IKP) flag 802, which indicates whether an inner-key padding and hashing operation has been performed; O2_Len 806, which is a current length of operand 2; and cryptography counter update pending (CCUP) flag 808 that indicates whether a cryptography counter access exception has been detected. It also obtains, e.g., an Org_O2_Len 804, which is an initial operand 2 length for the particular execution of the instruction.

In one aspect and example, process 800 performs one or more operations of the instruction (e.g., using perform operations code 416) including, for instance, determining 810 whether cryptography counter update pending (CCUP) flag 808 is set to a selected value, e.g., 1, and whether inner-key padding flag 802 is set to a selected value, e.g., 0 or Org_O2_Len 804 is greater than a selected value, e.g., 0. If cryptography counter update pending (CCUP) flag 808 is set to the selected value, e.g., 1, and inner-key padding flag 802 is set to the selected value, e.g., 0 or Org_O2_Len 804 is greater than the selected value, e.g., 0, then process 800 sets 812 cryptography counter update pending flag to another selected value (e.g., zero) to correct the user input.

Process 800 determines 814 whether the current length of operand 2 is greater than a selected value (e.g., zero). If the current length of operand 2 is greater than the selected value (e.g., zero), then process 800 processes 816 a next message block, as described with reference to FIG. 6A (e.g., processing of Part 2—626 to 636). Process 800 updates 818 operand 2 length. For instance, O2_Len is set equal to O2_Len-Block_Size (e.g., the size of the message block that was processed). Process 800 determines 820 whether processing of the Compute Message Authentication Code instruction has timed-out. If the processing has not timed-out, then processing proceeds to inquiry 814. However, if processing has timed-out, then the instruction (e.g., Compute Message Authentication Code instruction) is interrupted and process 800 returns 822 a condition code 3 indicating partial completion.

Returning to inquiry 814, if process 800 determines that O2_Len is not greater than the selected value (e.g., 0), then process 800 determines 840 whether cryptography counter update pending flag 808 is set to the selected value (e.g., 1). If the cryptography counter update pending flag is not set to the selected value (e.g., 1), then process 800 processes 850 Parts 3, 4 and 5 of the instruction (e.g., Part 3—input message padding and hashing operation; Part 4—outer-key padding and hashing operation; Part 5—output message padding and hashing operation). Process 800 determines 852 (e.g., subsequent to processing Part 3, Part 4 and Part 5) whether the processor activity instrumentation counter facility is enabled. If the processor activity instrumentation counter facility is unenabled, the instruction ends, and process 800 returns 854 a condition code of, e.g., zero specifying successful completion, as well as a cryptographic result (e.g., a hash-based message authentication code). If the processor activity instrumentation counter facility is enabled, process 800 determines 856 whether the appropriate processor activity instrumentation counter (e.g., the one corresponding to the function being performed) is accessible.

In one example, if the processor activity instrumentation counter is accessible, then process 800 updates 860 the processor activity instrumentation counter (i.e., performs Part 6 of the instruction processing; counter incremented by, e.g., one), sets the cryptography counter update pending flag to, e.g., 0, returns condition code zero indicating successful completion of the instruction and, in one example, provides (e.g., using provide result code 418) the cryptographic result (e.g., hash-based message authentication code). However, in one example, if the counter is inaccessible, process 800 sets 858 cryptography counter update pending flag to, e.g., one indicating an access exception condition for a storage location used by the counter; returns, e.g., condition code 3 indicating partial completion of the instruction due to an interruption; and, in one example, provides a cryptographic result (e.g., a hash-based message authentication code).

Returning to inquiry 840, if the cryptography counter update pending flag is set to the selected value (e.g., one), then, in one example, this indicates that, at least, Parts 3, 4 and 5 have already been processed in a prior, interrupted execution of the instruction. Thus, in one example, Parts 3, 4 and 5 are not re-processed (870), and process 800 determines 872 whether the processor activity instrumentation counter is accessible. If the processor activity instrumentation counter is inaccessible, then process 800 returns 874 the processor activity instrumentation counter access exception and the instruction ends with the condition code remaining unchanged. This signals the control program (e.g., operating system) that the location (e.g., memory or storage location) storing the counter is to be validated (e.g., brought into real storage, update data address translations, and/or perform other operations to validate the storage). The instruction may then be re-executed (e.g., from where it was interrupted (e.g., after Part 6 processing)) to update the counter.

If the processor activity instrumentation counter is accessible (872), then processing proceeds to step 860 in which process 800 updates the processor activity instrumentation counter (e.g., increments counter by, e.g., one), sets the cryptography counter update pending flag to, e.g., zero and sets the condition code to, e.g., zero. In one example, the updated counter is provided (e.g., it is accessible for retrieving the updated value). The resulting authentication code (an example of a cryptographic result) is not returned, however, in one example, since it was returned, for instance, at step 858.

As indicated, in one or more aspects, processor activity instrumentation processing is part of hash-based message authentication code processing. Further details of hash-based message authentication code processing of an instruction, such as a Compute Message Authentication Code instruction, are described with reference to FIG. 9. In one example, a hash-based message authentication code process 900 (also referred to as process 900) is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; one or more hardware accelerators separate and/or part of one or more processors and/or processing circuitry; and/or other computing devices, etc.). Additional and/or other computers, servers, devices, processors, nodes, processing circuitry, accelerators, and/or computing devices may be used to execute the processing and/or aspects thereof. Many examples are possible.

Figure 4A:
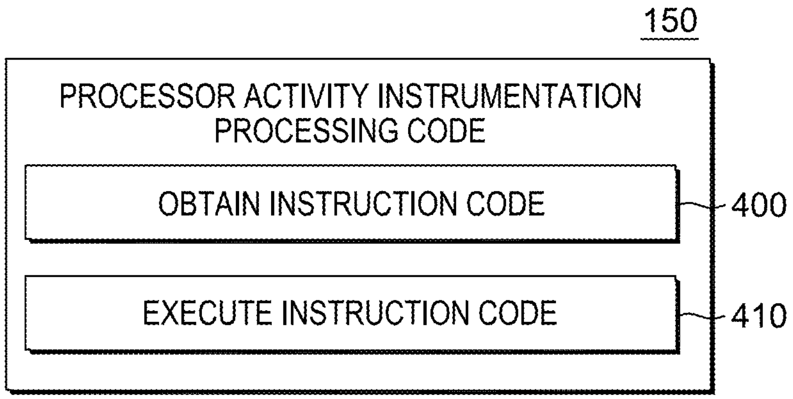
FIG. 4A depicts one example of processor activity instrumentation processing code of FIG. 1, in accordance with one or more aspects of the present disclosure.
Figure 4B:
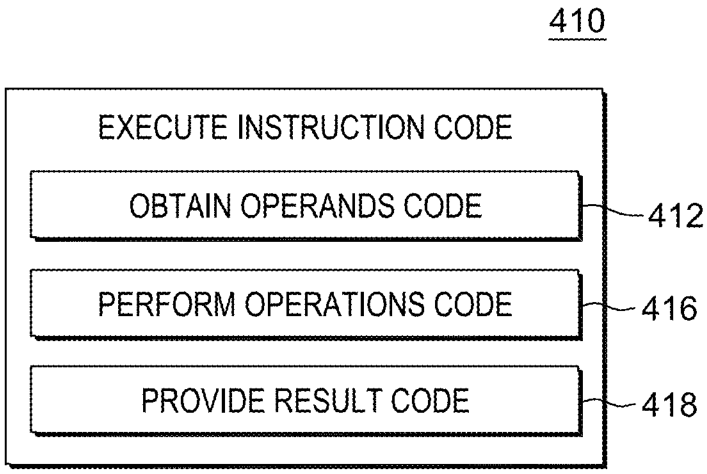
FIG. 4B depicts one example of the execute instruction code of the processor activity instrumentation processing code of FIG. 4A, in accordance with one or more aspects of the present disclosure.
Figure 9:
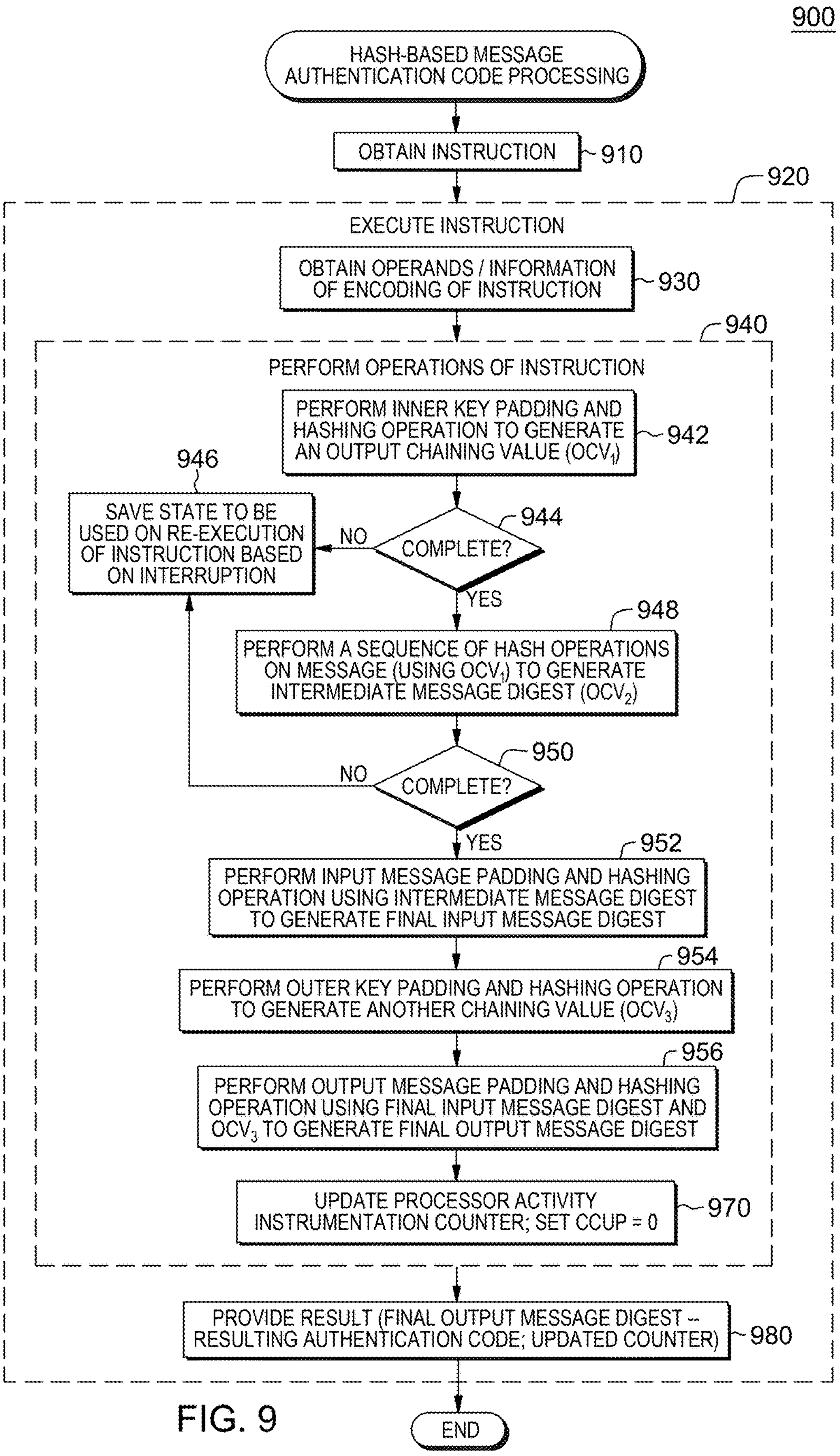
FIG. 9 depicts one example of hash-based message authentication code processing including processor activity instrumentation processing, in accordance with one or more aspects of the present disclosure.

Referring to FIG. 9, in one example, process 900 obtains 910 an instruction using, e.g., obtain instruction code 400 (FIG. 4A). For instance, process 900 obtains Compute Message Authentication Code instruction 500 (FIG. 5A) or another instruction. Process 900 executes 920 the instruction using, e.g., execute instruction code 410.

In one example, in executing the instruction, process 900 obtains 930 one or more operands and/or information of an encoding of the instruction. The operands and/or information obtained depends, for instance, on the function or operation to be performed. In one example, process 900 obtains an address of the message (e.g., using $R_2$), a length of the message (e.g., using $R_2+1$), one or more flags from flags field 544 of, e.g., general register 0, a function code from function code field 546 of, e.g., general register 0 and an address of a parameter block (e.g., using general register 1). One or more parameters may be obtained from the parameter block, such as one or more chaining values, an input message bit length and at least one key (e.g., a clear key, or an encrypted key and a wrapping key verification pattern); other examples are possible.

Using one or more of the operands, process 900 performs 940 a plurality of operations of the instruction, based, e.g., on the function code and using, e.g., perform operations code 416. For instance, process 900 performs 942 an inner-key padding and hashing operation (Part 1) to generate an output chaining value (e.g., $OCV_1$). For instance, as described with reference to FIG. 6A, to perform the inner-key padding and hashing operation, a cryptographic key (K) 602 (e.g., 512-bit (64-byte)) is exclusive-ORed 604 with an inner pad (ipad) 606 to produce an inner-key 608 (64-byte). A chaining value 1 ($CV_1$) 614 (e.g., 32-byte) is generated for inner-key 608 using, e.g., the SHA-256 block digest algorithm (bda) 610 with the $H^{(0)}$ 612 value (e.g., 32-byte) and the inner-key padding flag is set to, e.g., one. The generated chaining value 1 ($OCV_1$) 614, also called the output chaining value (OCV), is stored into the chaining value (CV) field of parameter block 618. If the operation ends due to partial completion, a specified condition code (e.g., condition code 3) is set.

Returning to FIG. 9, process 900 determines 944 if the inner-key padding and hashing operation is complete. If it is not complete (e.g., has been interrupted due to partial completion of the instruction (e.g., cc=3)), process 900 saves 946 the instruction state (e.g., the chaining value (e.g., $OCV_1$)). This allows the instruction to be re-executed based on the instruction (e.g., the inner-key padding and hashing operation of the instruction) being interrupted.

Based on process 900 determining 944 that the inner-key padding and hashing operation is complete, process 900 performs 948 a sequence of hash operations on a message (specified by the instruction), using the chaining value (e.g., $OCV_1$), to generate an intermediate message digest (IMD, e.g., $OCV_2$) (Part 2). For instance, as described with reference to FIG. 6A, intermediate message digest (IMD) 636 (e.g., 32-byte) is generated for the full input message blocks (M1, M2, . . . , Mn) 620 (e.g., 64-byte) in operand 2 632 using the SHA-256 block digest algorithm 634 with the chaining value ($ICV_1$) 626 (e.g., 32-byte) from the parameter block. If the intermediate input message part flag is, e.g., one or L is, e.g., zero, $M_{LFB}$ 628 is the last input message block (Mn); otherwise, $M_{LFB}$ is the input message block that immediately precedes the last (partial) input message block (Mn−1). The generated intermediate message digest ($OCV_2$ 636, also called the output chaining value (OCV)), is stored into the chaining value (CV) field of parameter block 618. This operation repeats until the remaining input message is less than, e.g., 64 bytes or until a CPU-determined number of blocks have been stored. If the operation ends due to partial completion, a specified condition code (e.g., condition code 3) is set.

Continuing with FIG. 9, process 900 determines 950 whether the calculation of the intermediate message digest (e.g., $OCV_2$) is complete. If process 900 determines that generation of the intermediate message digest is incomplete (e.g., has been interrupted due to partial completion of the instruction (e.g., cc=3)), process 900 saves 946 the instruction state (e.g., $OCV_2$). This allows the instruction to be re-executed based on the instruction (e.g., the generating the intermediate message digest operation of the instruction) being interrupted.

Based on process 900 determining 950 that the generating of the intermediate message digest is complete, process 900 performs 952 an input message padding and hashing operation (Part 3) using the intermediate message digest to generate a final input message digest. For example, the input message bit length is updated to include the input key bit length by, e.g., adding 512 (input key bit length) to input message bit length and any carry is ignored. Then, as described with reference to FIG. 6A, the padding operation 640 is performed either on the last (partial) input message block or on a null block (MPBM) 642 in operand 2 (based on the calculated L value) using the input message bit length in byte offsets 32-39 of the parameter block to produce the padded input message block. Next, a hashing operation 640 is performed on the padded input message block. For instance, the final input message digest (FIMD) 648 is generated using, e.g., the SHA-256 block digest algorithm with chaining value ($ICV_2$) 644 (e.g., 32-byte) from the parameter block.

Returning to FIG. 9, process 900 also performs 954 an outer-key padding and hashing operation (Part 4) to generate another chaining value ($OCV_3$). For example, as described with reference to FIG. 6A, cryptographic key (K) 602 (e.g., 512-bit (64-byte)) is exclusive-ORed 650 with outer pad (opad) 652 to produce outer-key 654 (e.g., 64-byte). A chaining value 3 ($OCV_3$) (e.g., 32-byte) 660 is generated for outer-key 654 (e.g., 64-byte) using the SHA-256 block digest algorithm 656 with the $H^{(0)}$ value 658 (e.g., 32-byte).

Continuing with FIG. 9, process 900 performs 956 an output message padding and hashing operation (Part 5) using the final input message digest and $OCV_3$ to generate the final output message digest. For example, as described with reference to FIG. 6A, after the chaining value 3 ($OCV_3$) 660 is generated, a padding operation 662 is performed on the final input message digest (FIMD) 648, also called the (partial) output message block ($M_{PMB}$), using the final input message digest (FIMD) bit length to produce the padded output message block. For Compute Message Authentication Code-Hash-based Message Authentication Code-SHA-224 and Compute Message Authentication Code-Hash-based Message Authentication Code-Encrypted-SHA-224 functions, the leftmost 28 bytes of the final input message digest (FIMD) is used as the (partial) output message block ($M_{PMB}$), L is set to, e.g., 28, and output message bit length is set to, e.g., 736. For Compute Message Authentication Code-Hash-Based Message Authentication Code-SHA-256 and Compute Message Authentication Code-Hash-Based Message Authentication Code-Encrypted-SHA-256 functions, the entire final input message digest (FIMD) is used as the (partial) output message block ($M_{PMB}$), L is set to 32, and OMBL is set to, e.g., 768.

Next, a final hashing operation 662 is performed on the padded output message block. For instance, the final output message digest (OCV) 664 is generated using the SHA-256 block digest algorithm with, e.g., the chaining value 3 ($OCV_3$) (e.g., 32-byte). The entire final output message digest (OCV) 664 is stored into the chaining value (CV) field of the parameter block.

Returning to FIG. 9, based on performing, at least, multiple operations (e.g., performing the input message padding and hashing operation (Part 3), performing the outer-key padding and hashing operation (Part 4) and performing the output message padding and hashing operation Part 5), process 900 updates 970 a corresponding processor activity instrumentation counter, assuming the processor activity instrumentation counter facility is enabled and the counter is accessible and sets the cryptography counter update pending flag is set to, e.g. zero.

Process 900 provides 980 a result (e.g., using provide result code 418) of the instruction. The result is, for instance, a final output message digest (e.g., resulting authentication code) and/or the updated processor activity instrumentation counter.

In one or more aspects, the operations, unless interrupted, are executed as part of a single execution of the instruction. In one or more aspects, the inner-key padding and hashing operation and the performing the sequence of operations to generate the intermediate message digest operation may be interrupted. If an operation of the instruction is interrupted, state of the instruction (e.g., an output chaining value (e.g., $OCV_1$ and $OCV_2$)) is saved, such that the instruction may be re-executed from where it was interrupted. Further, in one or more aspects, the update processor activity instrumentation counter processing (Part 6) may be interrupted, and if so, state of the instruction (e.g., CCUP flag) is saved that indicates whether an inaccessible counter has been detected and/or whether, e.g., Parts 3, 4 and 5 have been processed. Other examples are possible.

In one or more aspects, a processor activity instrumentation processing capability is provided that is, in one example, part of hash-based message authentication code processing that includes an interruptible instruction to perform and accelerate hash-based message authentication code processing, as well as processor activity instrumentation processing. The hash-based message authentication code processing provides a message authentication code that is used to authenticate and/or verify data. It may be used in many situations, including but not limited to, authenticating email addresses during login, verifying other types of data, securing communications within a computing environment and/or over a network, etc.

In one or more aspects, the instruction may be executed a plurality of times in performing complex cryptographic operations, such as password-based key derivation functions, as one example. Other examples are possible.

In one or more aspects, a counter located in an unassociated area of an instruction and the instruction's functions (e.g., Compute Message Authentication Code instruction-Hash-Based Message Authentication Code function) is updated. The unassociated area is a location in, e.g., memory or storage that is owned by an entity other than the instruction, such as by a control program (e.g., operating system). In one example, subsequent to processing an algorithm (e.g., hash-based message authentication code algorithm part (e.g., at least, multiple parts, such as Part 3, 4, 5 of the algorithm), a processor activity instrumentation facility counter update operation is inserted. A processor activity instrumentation counter access exception check is performed, e.g., once after processing the entire algorithm (e.g., hash-based message authentication code algorithm). The processor activity instrumentation counter access exception is reported (e.g., to software) after it is detected for the first time. The processor activity instrumentation counter storage is validated after the exception is detected for, e.g., the first time. The instruction is re-executed to allow the machine to update the processor activity instrumentation counter and complete the instruction execution without abnormally ending the instruction. Subsequent to detecting the processor activity instrumentation counter access exception for the first time, both the function results and the processor activity instrumentation counter access exception are reported, e.g., at the same time.

In one or more aspects, multiple operation states are indicated using the same flag (e.g., cryptography counter update pending flag) depending on the state of execution, to reduce the number of flags and to bypass the algorithm segments(s) or part(s) that have already been processed, on re-execution of the instruction.

In one or more aspects, a processor activity instrumentation counter update operation is inserted and performed after the last hash-based message authentication code algorithm part (e.g., Part 5). A processor activity instrumentation counter update operation is performed as a hash-based message authentication code algorithm part (e.g., Part 6) to integrate it into the overall hash-based message authentication code algorithm process. In one example, a processor activity instrumentation counter access exception check is performed (e.g., once) after processing at least multiple parts (e.g., Parts 3-5) of the algorithm. In one example, the processor activity instrumentation counter access check is performed (e.g., once) after processing the entire algorithm (e.g., Parts 1-5) to minimize checking overhead resulting from many redrives. In one example, a processor activity instrumentation counter access exception is reported when it is detected for the first time to allow, e.g., the software to discover and mitigate the processor activity instrumentation counter storage issue earlier to enhance software performance. In one example, the function results and the processor activity instrumentation counter access exception are reported, e.g., at the same time if the function stores any results and detects a processor activity instrumentation counter access exception. In one example, the cryptography counter update pending flag is used to replace multiple segments/paths control flags which reduces the number of flags that are used to process the same number of segments. It also reduces flag checking complexity and maximizes firmware and software performance. As used herein, firmware includes, e.g., the microcode or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, the cryptography counter update pending flag is treated as an output-only flag and is reset to, e.g., zero at the initial execution of the function to eliminate termination of the function due to a software error. It further reduces flag checking complexity and maximizes firmware and software performance. In one example, the cryptography counter update pending flag is reset to, e.g., zero after a processor activity instrumentation counter update is successful to make the cryptography counter update pending flag state predictable by the software.

In one or more aspects, a processor activity instrumentation counter access exception check is performed after processing the entire algorithm to minimize checking overhead resulting from many redrives. It allows the machine to report both the function results and the processor activity instrumentation counter access exception at the same time which speeds up hardware performance (this is different from a definition of the architecture). In one example, the software may discover and mitigate the processor activity instrumentation counter storage issue earlier (without re-execution) and bypass lengthy and time-consuming interrupt processing which speeds up performance. In one example, the cryptography counter update pending flag is used to reduce the total number of flags to perform the same number of algorithm segments that are used to process the same number of segments. It also reduces the total number of variable combinations checking which speeds up hardware performance.

In one or more aspects, the hash-based message authentication code algorithm processing controls are located in general registers (instead of in program storage) which improves machine performance.

In one or more aspects, intermediate input message part flag in general register 0 (not in storage for increasing execution speed) is used to determine if the parts to be processed includes, e.g., the last part. The hash-based message authentication code algorithm processing is broken into multiple (e.g., 2) separate paths to allow discontiguous input message parts in storage. This flag allows the machine (i.e., firmware) to determine which path to process—the intermediate input message part processing path or the last input message part processing path. When the intermediate input message part flag=0, operand 2 in general register $R_2$ contains the last input message part. When the intermediate input message part flag=1, operand 2 contains the intermediate input message part. The processor activity instrumentation counter is updated at the end of each path and this new processor activity instrumentation counter update technique works for both paths. One or more aspects described herein describe how the processor activity instrumentation counter is updated using the cryptography counter update pending flag when the intermediate input message part flag=0. This same technique can be used for updating the processor activity instrumentation counter using the cryptography counter update pending flag when the intermediate input message part=1.

In one or more aspects, the inner-key padding flag in general register 0 (not in storage for increasing execution speed) is used to determine if Part 1 (e.g., the inner-key padding and hashing operation) has been performed. This flag allows the machine (i.e., firmware) to interrupt the hash-based message authentication code algorithm processing either before or after processing Part 1, terminate the hash-based message authentication code algorithm processing, update the inner-key padding flag (inner-key padding flag=0 means Part 1 has not been processed, and inner-key padding flag=1 means Part 1 has been processed), and return CC=3. A computing device (e.g., software executing thereon) re-drives the same hash-based message authentication code algorithm function with the updated hash-based message authentication code algorithm processing state and the machine processes Part 1, e.g., only if inner-key padding flag=0.

In one or more aspects, since the hash-based message authentication code algorithm has multiple parts and the Compute Message Authentication Code instruction is interruptible (partial completion ending with CC=3 which is to be re-driven to continue processing until the end of the algorithm is reached), processing each interruptible part is to be remembered using a state variable. Having many distinct parts uses more state variables to remember which distinct parts have been processed to avoid re-processing the same part(s) more than once. Invalid combinations of the state variables are to be checked and reported, and the state variables are to be reviewed and updated, both of which introduce hardware/firmware complexity especially as the number of state variables increases. Therefore, to reduce the number of state variables, smaller and fast processing adjacent parts are grouped together to form a single larger block and processed as a single unit without interruption. In this case, Part 1 is controlled by the inner-key padding state flag, Part 2 is controlled by operand-2 length (O2_LEN), and Parts 3, 4, 5 may be controlled by an outer-key pending state flag.

Further, in one or more aspects, there is a processor activity instrumentation counter for each cryptographic algorithm function of each cryptographic instruction in a separate operating system storage area and they are enabled using the processor activity instrumentation facility. Normally, all the storage areas are tested for access exception at the start of the function. But, to gain processing efficiency, in accordance with one or more aspects, the cryptography counter set storage is tested for storage access exception at the time of use (end of the function). Older cryptographic instructions are designed to update its counter for each cryptographic algorithm function immediately after operand-2 (input message) length goes to zero. However, since hash-based message authentication code algorithm has more parts after operand-2 (input message) is processed, updating the processor activity instrumentation counter for each hash-based message authentication code algorithm function immediately after operand-2 (input message) length goes to zero may negatively affect execution speed for the Compute Message Authentication Code instruction or introduce more complex logic. Thus, in accordance with one or more aspects, a capability is provided that is simple, minimizes state variables checking, provides processor activity instrumentation counter update exception indication at the time it is detected, and can be used by cryptographic instructions of other complex cryptographic algorithms.

In one or more aspects, the operand 2 length (O2_LEN) in general register $R_2+1$ (not in storage for increasing execution speed) is used to determine how much data of Part 2 (input message part) has not been performed. This field allows the machine (i.e., firmware) to interrupt the hash-based message authentication code algorithm processing either before processing any blocks of Part 2 or after processing 1 to max blocks of Part 2, terminate the hash-based message authentication code algorithm processing, update the O2_LEN (O2_LEN=0 means all the blocks of Part 2 have been processed, and O2_LEN>0 means all the blocks of Part 2 have not been processed), and return CC=3. A computing device (e.g., software executing thereon) re-drives the same hash-based message authentication code algorithm function with the updated hash-based message authentication code algorithm processing state and the machine starts with processing either remaining blocks of Part 2 if O2_LEN>0 or Part 3 (the input message padding and hashing operation) if O2_LEN=0. The machine determines the interrupt point of the hash-based message authentication code algorithm processing based on its own internal criteria. As a result, the machine may interrupt the hash-based message authentication code algorithm processing many times before processing all the blocks of Part 2.

In one or more aspects, cryptography counter update pending flag in general register 0 (not in storage for increasing execution speed) is used to determine if Parts 3, 4, 5 (input message padding and hashing operation, outer-key padding and hashing operation, and output message padding and hashing operation) have been performed and/or if the processor activity instrumentation counter update exception (i.e., processor activity instrumentation counter access exception) has been detected. This flag allows the machine (i.e., firmware) to interrupt the hash-based message authentication code algorithm processing either before processing Parts 3, 4, 5 or after processing Parts 3, 4, 5 and testing for a processor activity instrumentation counter update exception if the machine is enabled for processor activity instrumentation counter update. It detects the processor activity instrumentation counter update exception, terminates the hash-based message authentication code algorithm processing, sets cryptography counter update pending flag=1 (cryptography counter update pending flag=0 means Parts 3, 4, 5 have not been processed and the processor activity instrumentation counter update exception has not been tested, and cryptography counter update pending flag=1 means Parts 3, 4, 5 have been processed and the processor activity instrumentation counter update exception has been detected), and returns CC=3. A computing device (e.g., software executing thereon) re-drives the same hash-based message authentication code algorithm function with the updated hash-based message authentication code algorithm processing state and the machine processes Parts 3, 4, 5, e.g., only if cryptography counter update pending flag=0. The machines eventually returns CC=0 (normal completion) and cryptography counter update pending flag=0 after updating the processor activity instrumentation counter if the processor activity instrumentation counter update is enabled and accessible which completes the processing of the entire hash-based message authentication code algorithm.

In one or more aspects, instead of using both an outer-key padding flag and a cryptography counter update pending flag, an outer-key padding flag is eliminated and instead, e.g., only the cryptography counter update pending flag is used to determine if Parts 3, 4, 5 operations have been performed and the processor activity instrumentation counter update exception (i.e., processor activity instrumentation counter access exception) has been detected by the Compute Message Authentication Code-Hash-Based Message Authentication Code function.

In one or more aspects, to eliminate state variables checking to look for user specified errors and to report an error (i.e., specification exception) for an otherwise valid operation, the cryptography counter update pending flag is designed as, e.g., an output indicator only. That is, if the user inputs an incorrect cryptography counter update pending flag value, the cryptography counter update pending flag value is updated with the correct value and the requested operations are performed, instead of reporting an error (i.e., specification exception). For example, if the user sets cryptography counter update pending flag=1 before Parts 1, 2 operations have been performed, the machine sets cryptography counter update pending flag=0 instead of reporting a specification exception.

In one or more aspects, if the function has stored any results before detecting an inaccessible processor activity instrumentation counter storage location, it does not report both the function progress and the processor activity instrumentation counter update exception using a program interrupt because the architecture, in one example, states when an access exception is recognized, the instruction execution ends in suppression or nullification. That is, no result fields may be changed. However, in one or more aspects, the function terminates with CC=3 to report, e.g., only data processed thus far and sets cryptography counter update pending cryptography counter update pending flag=1 to indicate both the function progress (e.g., Parts 3, 4, 5 operations) as well as the processor activity instrumentation counter update exception when it is actually detected (not delayed reporting in the next re-execution of the same Compute Message Authentication Code-Hash-Based Message Authentication Code function). When the program re-executes the function with the cryptography counter update pending flag=1, indicating not to perform certain operations (e.g., Parts 3, 4, 5 operations), and the machine encounters the processor activity instrumentation counter update exception again, it finally reports the processor activity instrumentation counter update exception via a program interrupt which is delayed reporting (reported in the next re-execution of the specified Compute Message Authentication Code-Hash-Based Message Authentication Code function).

In one or more aspects, the machine sets the cryptography counter update pending flag=0 when CC=0 is reported to indicate the processor activity instrumentation counter has been updated (if enabled) which makes the cryptography counter update pending flag states predictable by, e.g., the software for, e.g., all cases.

In one example, after Parts 1, 2 operations have been performed, the cryptography counter update pending flag is used to determine and perform Parts 3, 4, 5 and the processor activity instrumentation counter update operations.

- If, for instance, cryptography counter update pending flag=0, then Parts 3, 4, 5 operations are performed. If the processor activity instrumentation counter facility is not enabled, then CC=0 (normal completion) is returned which completes the hash-based message authentication code algorithm. The cryptography counter update pending flag value is not set to zero because it is already set to zero.
- If, for instance, cryptography counter update pending flag=0, then Parts 3, 4, 5 operations are performed. If the processor activity instrumentation counter facility is enabled but the processor activity instrumentation counter is not accessible, then the cryptography counter update pending flag=1 to indicate processor activity instrumentation counter update exception (i.e., processor activity instrumentation counter access exception) as well as Parts 3, 4, 5 operations have been performed (multiple parts state indication) and CC=3 (partial completion) is returned. A computing device (e.g., software executing thereon) is to re-issue the same Compute Message Authentication Code-Hash-Based Message Authentication Code function with the parameter block containing the current processing state information to complete processing the hash-based message authentication code algorithm. Note, in one example, that processor activity instrumentation counter update exception is being reported at the same time it is detected (not delayed).
- If, for instance, cryptography counter update pending flag=0, then Parts 3, 4, 5 operations are performed. If the processor activity instrumentation counter facility is enabled and the processor activity instrumentation counter is accessible, then the processor activity instrumentation counter for this Compute Message Authentication Code-Hash-Based Message Authentication Code function is updated, the cryptography counter update pending flag=0 to indicate processor activity instrumentation counter has been updated, as well as Parts 3, 4, 5 operations have been performed (multiple parts state indication) and CC=0 (normal completion) is returned which completes the hash-based message authentication code algorithm.

If, for instance, cryptography counter update pending flag=1 but Parts 1, 2 operations have not performed (inner-key padding=0), or the operand 2 length is greater than zero (O2_LENGTH>0), then the machine sets cryptography counter update pending flag=0 to correct the cryptography counter update pending state instead of reporting an error (i.e., specification exception).

If, for instance, cryptography counter update pending flag=1, then Parts 3, 4, 5 operations are not performed because they were already performed when cryptography counter update pending flag=1 was set. There is also no need to check if the processor activity instrumentation counter facility is enabled because cryptography counter update pending flag=1 is set only if it is enabled. If the processor activity instrumentation counter is not accessible, then return processor activity instrumentation counter update exception interrupt (i.e., processor activity instrumentation counter access exception) only is returned. There is no need to set cryptography counter update pending flag=1 (to indicate processor activity instrumentation counter update exception) because cryptography counter update pending flag=1 already or update the condition code. Note, in one example, that this is a delayed reporting of the processor activity instrumentation counter update exception interrupt because the machine is to report the operations that were performed (Parts 3, 4, 5 operations) before presenting the processor activity instrumentation counter update exception interrupt (cryptography counter update pending flag=1 and CC=3 case). The machine does not provide, e.g., both a program interrupt and function progress for access exception interrupt. Also, cryptography counter update pending flag=1 is used to bypass performing Parts 3, 4, 5 operations.

If, for instance, cryptography counter update pending flag=1, then Parts 3, 4, 5 operations are not performed because they were already performed when cryptography counter update pending flag=1 was set. There is also no need to check if the processor activity instrumentation counter facility is enabled because cryptography counter update pending flag=1 is set only if it is enabled. If the processor activity instrumentation counter is accessible (processor activity instrumentation counter storage made available by, e.g., software), then the processor activity instrumentation counter for this Compute Message Authentication Code-Hash-Based Message Authentication Code function is updated, the cryptography counter update pending flag=0 to indicate processor activity instrumentation counter has been updated, as well as Parts 3, 4, 5 operations have been performed (multiple parts state indication) and CC=0 (normal completion) is returned, which completes the hash-based message authentication code algorithm.

In one or more aspects, a counter located in an unassociated storage area of an instruction and its functions (e.g., Compute Message Authentication Code-Hash-Based Message Authentication Code instruction/function) is updated by, for instance, inserting a processor activity instrumentation counter update operation after, e.g., the last hash-based message authentication code algorithm part, performing a processor activity instrumentation counter access exception check (e.g., once) after processing the entire hash-based message authentication code algorithm, reporting a processor activity instrumentation counter access exception when it is detected for the first time to the software, fixing/bringing-in/validating, e.g., by the operating system the processor activity instrumentation counter storage after the exception is detected for the first time, and re-executing the instruction to allow the machine to update the processor activity instrumentation counter and to complete the instruction execution without abnormally terminating the instruction.

In one or more aspects, both the function results and the processor activity instrumentation counter access exception are reported, e.g., at the same time when the processor activity instrumentation counter access exception is detected for the first time.

In one or more aspects, the same cryptography counter update pending flag is used to indicate multiple different operational states depending on the stage of execution to reduce the number of flags, and to bypass the algorithm segment(s) or path(s) that have already been processed on re-execution of the instruction.

In one or more aspects, the processor activity instrumentation counter update process is treated and performed as a hash-based message authentication code algorithm part to integrate it into the overall hash-based message authentication code algorithm process. The cryptography counter update pending flag is treated, in one example, as an output-only flag to eliminate or reduce termination of the function due to, e.g., a software error.

In one or more aspects, an invalid cryptography counter update pending flag, input by the machine based on other algorithm progress states, is detected and corrected to eliminate or reduce correcting the cryptography counter update pending flag error and then re-driving the function, e.g., by the software. In one example, algorithm segment(s) or path(s) that has already been processed is bypassed on re-execution of the same instruction and its function to enable, e.g., Live Guest Relocation. In one or more aspects, the cryptography counter update pending flag is reset after a processor activity instrumentation counter update is successful to make the cryptography counter update pending flag state predictable by, e.g., the software.

Figure 10A:
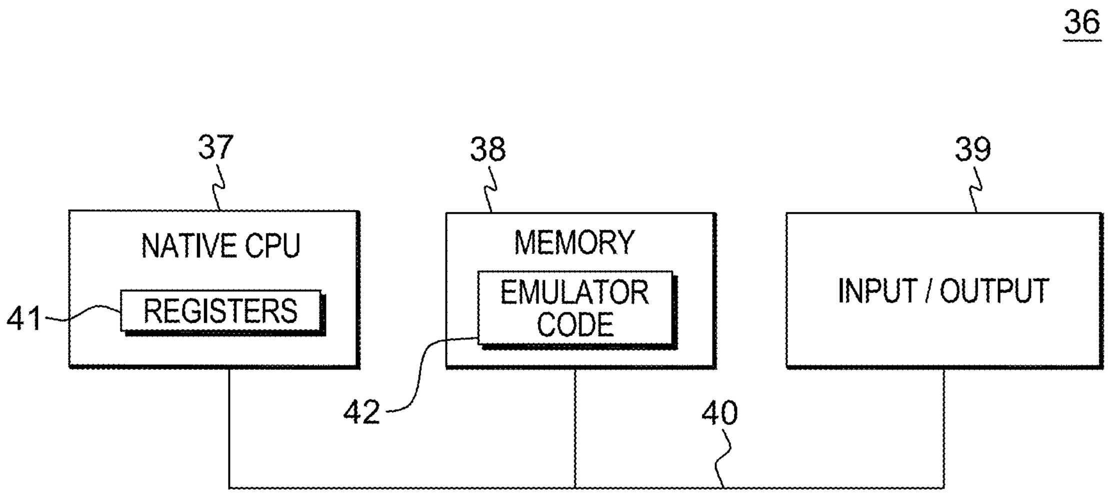
FIGS. 10A-10B depict another example of a computing environment to incorporate and use one or more aspects of the present disclosure.
Figure 10B:
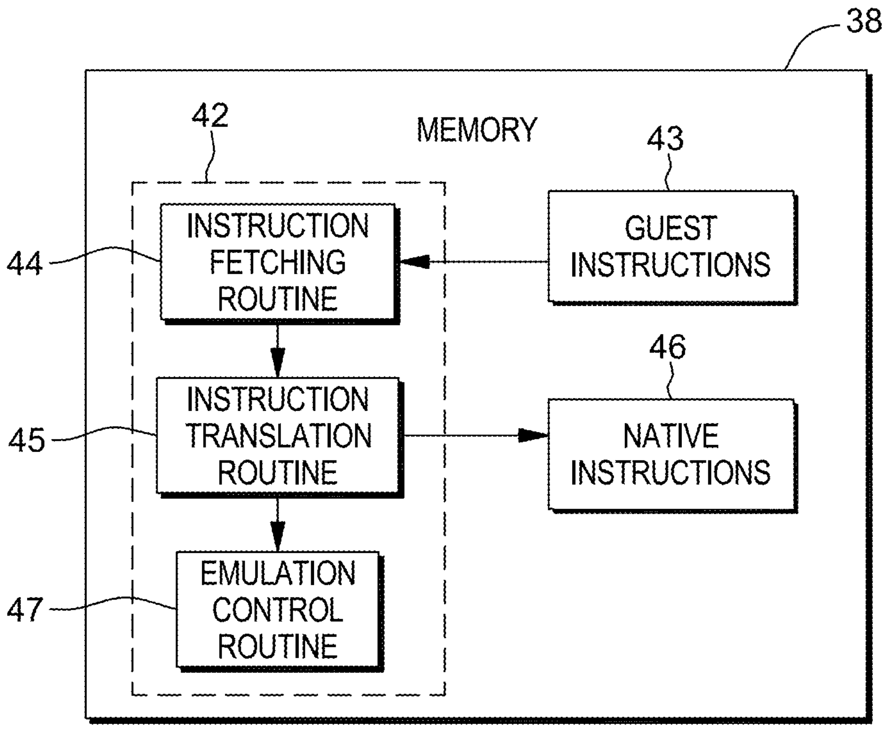

Although one or more examples of a computing environment to incorporate and use one or more aspects of the present disclosure are described herein, FIGS. 10A-10B depict another embodiment of a computing environment to incorporate and use one or more aspects of the present disclosure.

Referring, initially, to FIG. 10A, in this example, a computing environment 36 includes, for instance, a native central processing unit (CPU) 37 based on one architecture having one instruction set architecture, a memory 38, and one or more input/output devices and/or interfaces 39 coupled to one another via, for example, one or more buses 40 and/or other connections.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture (different from the one architecture) and to execute software and instructions developed based on the other architecture.

Further details relating to emulator code 42 are described with reference to FIG. 10B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the other instruction set architecture, but instead, are being emulated on native central processing unit 37, which may be, for example, the one instruction set architecture. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native central processing unit 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native central processing unit or by using locations in memory 38. In embodiments, guest instructions 43, native instructions 46 and emulator code 42 may reside in the same memory or may be disbursed among different memory devices.

An example instruction that may be emulated is the Compute Message Authentication Code instruction described herein, in accordance with one or more aspects of the present disclosure. Further, processor activity instrumentation processing may be emulated. Other examples are possible.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to implement processor activity instrumentation processing, accelerated and/or interruptible hash-based message authentication code processing and/or to perform one or more other aspects of the present disclosure.

One or more aspects of the present disclosure are tied to computer technology and facilitate processing within a computer, improving performance thereof. For instance, processing speed is increased, and latency is reduced by using one instruction, e.g., one architected instruction, to perform hash-based message authentication code processing including processor activity instrumentation processing.

In one or more aspects, a hardware and firmware co-design is provided that enables the computing of a hash-based message authentication code synchronously within a processor core pipeline, providing very low latency. In one or more aspects, an instruction is configured and used to accelerate hash-based message authentication code generation in a processor core. Operations to generate a hash-based message authentication code are performed based on parameters within a processor core pipeline synchronously.

In one or more aspects, one or more controls of the instruction enable the instruction to be interrupted and/or facilitate hash-based message authentication code processing. For instance, a flag bit (e.g., intermediate input message part flag) in the instruction parameter field allows firmware to interrupt the operation (e.g., at any time or selected time) to service higher priority interrupts, providing high responsiveness. As another example, a flag bit (e.g., intermediate input message part flag) in the instruction parameter field allows hash-based message authentication code processing to be performed with an incomplete parameter block (input chaining values to be used in hash-based message authentication code processing are saved in the parameter block as the processing progresses), reducing system latency. Further, in one example, a flag bit (e.g., an inner-key padding flag; an intermediate input message part flag; and/or an operand 2 length) in one or more instruction fields allows hardware to use software-provided parameters to resume a previously interrupted operation or to initiate the standard's constant parameters, enabling system responsiveness and lower latency.

In one or more aspects, a single instruction and parameter set enable lower software processing overheads and higher performance. Reducing and/or eliminating the chaining of back-to-back accelerator calls to compute hash-based message authentication code results in lower overhead, improving performance.

In one or more aspects, a key used by the instruction may be protected by wrapping the key with a system key to increase security of the system.

In one or more aspects, a hash-based message authentication code operation is computed (generated) within a processor core pipeline synchronously based on parameters encapsulated by an instruction (e.g., the Compute Message Authentication Code instruction). In one example, the instruction is a single instruction that encapsulates the parameters (e.g., all parameters) to trigger the hardware to perform operations of the instruction. In one or more aspects, a hash-based message authentication code operation is performed within a processor core pipeline based on one or more parameters of the instruction. In one or more aspects, the instruction is used to accelerate hash-based message authentication code computation in a processor core (instead of an external peripheral). The instruction has a format including, for instance, a key, a message address and a length, as parameters; state information or a chaining value to allow interruption and resuming of the operation (i.e., the instruction); a flag to allow early interruption for responsiveness (e.g., an intermediate input message part flag); a flag to allow a partial hash-based message authentication code (e.g., an intermediate input message part flag); a flag to allow hardware to initialize a hash at start (e.g., an inner-key padding flag); a flag to perform processor activity instrumentation (e.g., a cryptography counter update pending flag); and allows use of keys protected from software and used by index tokens.

In one or more aspects, hardware and firmware (e.g., millicode) partitioning of hash-based message authentication code computation is provided. In one or more aspects, a hardware accelerator of a processor core is used that sequences back-to-back hashing operations to compute a hash-based message authentication code on a pipelined hashing accelerator engine. In one or more aspects: hardware computed key padding operations (e.g., ipad, opad) are performed; hardware is used to auto-initialize constants as per the operation based on a flag (e.g., inner-key padding flag); scheduling of key padding hash and message hash is performed in a way to allow interruption and resuming of operations by storing a single state value (e.g., use of intermediate input message part flag); protection of key latches on a scan dump is provided; computation of padding in firmware is performed prior to loading into hardware; and/or central processing unit interrupts are detected in firmware triggering hardware to stop hash-based message authentication code computation via one or more control bits (e.g., intermediate input message part flag).

In one or more aspects, hardware, firmware (millicode) partitioning of hash-based message authentication code generation such that message padding is handled in firmware but key padding in hardware and hardware returns context data to allow interruptability, as well as firmware detected interruptions. In one or more aspects, hardware-firmware partitioning is provided that supports interruptability. In one or more aspects, the hardware does not require external control signals to sequence different parts of the operation. Parameters of the instruction are used to control the operations.

In one or more aspects, interrupting includes terminating execution of the instruction prior to completion (e.g., at partial completion) with, e.g., a selected condition code (e.g., CC=3). Such an interrupted instruction may be re-executed from where it was interrupted, in accordance with one or more aspects, and avoids, for instance, a program interrupt exception that is typically handled by an interrupt handler.

Other and/or different aspects may be provided and/or included in processing of the single instruction. Processing within a processor, computer system and/or computing environment is improved.

In one or more aspects, the cryptography counter update pending flag error checking complexity is eliminated or reduced by the machine which improves firmware performance. In one or more aspects, it is unknown whether access to the counter is to be performed to complete the operation. As processing commences, in one example, the cryptography counter update pending flag is set to, e.g., zero. Correcting a cryptography counter update pending flag error and then re-driving of the function are eliminated or reduced which improves software performance. In one or more aspects, the cryptography counter update pending flag is used to reduce the number of flags that are used to process the same number of segments/paths. The machine is enabled to report both the function results and the processor activity instrumentation counter access exception condition (e.g., CCUP=1) at the same time, which enhances machine performance. The processor activity instrumentation counter storage issue is discovered and mitigated earlier which enhances performance. The cryptography counter update pending flag state is predictable. Software and hardware performance are improved, and backwards compatibility is provided.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer-readable code into a computing system, in which the code in combination with the computing system is capable of performing one or more embodiments.

Yet a further aspect, a process for integrating computing infrastructure comprising integrating computer-readable code into a computer system may be provided. The computer system comprises a computer-readable medium, in which the computer medium comprises one or more embodiments. The code in combination with the computer system is capable of performing one or more embodiments.

Although various embodiments are described above, these are only examples. For example, other instructions, instruction formats, operands and/or registers may be used. Further, other cryptographic algorithms may be used. Moreover, additional, less and/or other code may be used. Although particular code may be provided as an example of performing a particular operation or task, additional and/or other code may be used. Code may be combined and/or separated into code subsets. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:

a set of one or more computer-readable storage media; and program instructions, collectively stored in the set of one or more computer-readable storage media, for causing at least one computing device to perform computer operations including:

executing an instruction to perform cryptographic processing, the executing the instruction including:

performing a plurality of operations of the instruction to generate a cryptographic result;

detecting, based on performing at least multiple operations of the plurality of operations, an access exception condition for a storage location used by an instrumentation counter, the instrumentation counter assigned to a selected cryptographic function, the selected cryptographic function used in the performing the plurality of operations to generate the cryptographic result the instrumentation counter configured to be updated based on performing the cryptographic processing; and interrupting execution of the instruction indicating incomplete processing, based on detecting the access exception condition; and re-executing the instruction to obtain access to the instrumentation counter, the re-executing the instruction starting from where execution was interrupted and including updating the instrumentation counter, based on the storage location used by the instrumentation counter being validated.

2. The computer program product of claim 1, wherein the cryptographic result is a message authentication code.

3. The computer program product of claim 1, wherein the storage location used by the instrumentation counter is owned by a control program.

4. The computer program product of claim 1, wherein the updating the instrumentation counter is performed absent re-execution of the at least multiple operations.

5. The computer program product of claim 1, wherein the executing the instruction further includes setting an indicator to a selected value, based on detecting the access exception condition, and wherein the re-executing the instruction includes checking the indicator to determine where execution was interrupted.

6. The computer program product of claim 5, wherein based on the indicator being set to the selected value and re-executing the instruction, processing of the at least multiple operations is bypassed, the at least multiple operations including an input message padding and hashing operation, an outer-key padding and hashing operation and an output message padding and hashing operation.

7. The computer program product of claim 6, wherein based on the indicator being set to the selected value and re-executing the instruction, the plurality of operations includes checking accessibility of the instrumentation counter and performing the updating of the instrumentation counter based on the instrumentation counter being accessible.

8. The computer program product of claim 5, wherein the executing the instruction includes setting the indicator to another selected value at initial execution of the instruction.

9. The computer program product of claim 1, wherein the performing the plurality of operations includes:

performing a sequence of hash operations on a message obtained using the instruction to generate an intermediate message digest, the performing the sequence of hash operations using an output chaining value generated based on performing an inner-key padding and hashing operation using a cryptographic key of the instruction; and performing an outer-key padding and hashing operation using the cryptographic key to generate another output chaining value to be used in generating a final output message digest based on a final input message digest produced using the intermediate message digest, the final output message digest being a resulting authentication code, the resulting authentication code being the cryptographic result.

10. The computer program product of claim 9, wherein the performing the plurality of operations further includes performing the inner-key padding and hashing operation using the cryptographic key to generate the output chaining value, wherein the performing the inner-key padding and hashing operation includes:

producing an inner-key based on performing a selected operation with the cryptographic key and an inner padding value;

generating the output chaining value for the inner-key using a hash operation and an input chaining value; and storing the output chaining value that is generated in a parameter block that is input to the instruction.

11. The computer program product of claim 10, wherein the performing the sequence of hash operations on the message obtained using the instruction includes processing a plurality of message blocks of the message, the processing the plurality of message blocks including performing a plurality of block digest hash operations on the plurality of message blocks using the output chaining value as input to the processing of the plurality of message blocks to obtain the intermediate message digest, and wherein the performing the plurality of operations further includes performing an input message padding and hashing operation for the message, the performing the input message padding and hashing operation for the message including:

performing a padding operation on a final message block of the message to produce a padded input message block; and performing a hash operation, using the intermediate message digest, on the padded input message block to generate the final input message digest.

12. The computer program product of claim 11, wherein the performing the outer-key padding and hashing operation includes:

producing an outer-key based on performing the selected operation with the cryptographic key and an outer padding value; and generating the another output chaining value for the outer-key using a selected hash operation and the input chaining value.

13. The computer program product of claim 12, wherein the performing the plurality of operations further includes performing an output message padding and hashing operation, the performing the output message padding and hashing operation including:

performing a final padding operation on the final input message digest to produce a padded output message block; and performing a final hashing operation, using the another output chaining value, on the padded output message block to generate the final output message digest, the final output message digest being the cryptographic result.

14. The computer program product of claim 9, wherein the performing the plurality of operations further includes:

performing the inner-key padding and hashing operation to generate the output chaining value;

performing an input message padding and hashing operation for the message using the intermediate message digest to generate the final input message digest; and performing an output message padding and hashing operation using the final input message digest and the another output chaining value to produce the resulting authentication code.

15. A computer system comprising:

at least one computing device;

a set of one or more computer-readable storage media; and program instructions, collectively stored in the set of one or more computer-readable storage media, for causing the at least one computing device to perform computer operations including:

executing an instruction to perform cryptographic processing, the executing the instruction including:

performing a plurality of operations of the instruction to generate a cryptographic result;

detecting, based on performing at least multiple operations of the plurality of operations, an access exception condition for a storage location used by an instrumentation counter, the instrumentation counter assigned to a selected cryptographic function, the selected cryptographic function used in the performing the plurality of operations to generate the cryptographic result, the instrumentation counter configured to be updated based on performing the cryptographic processing; and interrupting execution of the instruction indicating incomplete processing, based on detecting the access exception condition; and re-executing the instruction to obtain access to the instrumentation counter, the re-executing the instruction starting from where execution was interrupted and including updating the instrumentation counter, based on the storage location used by the instrumentation counter being validated.

16. The computer system of claim 15, wherein the updating the instrumentation counter is performed absent re-execution of the at least multiple operations.

17. The computer system of claim 15, wherein the executing the instruction further includes setting an indicator to a selected value, based on detecting the access exception condition, and wherein the re-executing the instruction includes checking the indicator to determine where execution was interrupted.

18. The computer system of claim 17, wherein based on the indicator being set to the selected value and re-executing the instruction, processing of the at least multiple operations is bypassed, the at least multiple operations including an input message padding and hashing operation, an outer-key padding and hashing operation and an output message padding and hashing operation.

19. A computer-implemented method comprising:

executing an instruction to perform cryptographic processing, the executing the instruction including:

performing a plurality of operations of the instruction to generate a cryptographic result;

detecting, based on performing at least multiple operations of the plurality of operations, an access exception condition for a storage location used by an instrumentation counter, the instrumentation counter assigned to a selected cryptographic function, the selected cryptographic function used in the performing the plurality of operations to generate the cryptographic result, the instrumentation counter configured to be updated based on performing the cryptographic processing; and interrupting execution of the instruction indicating incomplete processing, based on detecting the access exception condition; and re-executing the instruction to obtain access to the instrumentation counter, the re-executing the instruction starting from where execution was interrupted and including updating the instrumentation counter, based on the storage location used by the instrumentation counter being validated.

20. The computer-implemented method of claim 19, wherein the updating the instrumentation counter is performed absent re-execution of the at least multiple operations.

21. The computer-implemented method of claim 19, wherein the executing the instruction further includes setting an indicator to a selected value, based on detecting the access exception condition, and wherein the re-executing the instruction includes checking the indicator to determine where execution was interrupted.

22. The computer-implemented method of claim 21, wherein based on the indicator being set to the selected value and re-executing the instruction, processing of the at least multiple operations is bypassed, the at least multiple operations including an input message padding and hashing operation, an outer-key padding and hashing operation and an output message padding and hashing operation.

23. The computer-implemented method of claim 21, wherein based on the indicator being set to the selected value and re-executing the instruction, the plurality of operations includes checking accessibility of the instrumentation counter and performing the updating of the instrumentation counter based on the instrumentation counter being accessible.

24. A computer program product comprising:

a set of one or more computer-readable storage media; and program instructions, collectively stored in the set of one or more computer-readable storage media, for causing at least one computing device to perform computer operations including:

executing an instruction to perform hash-based message authentication code processing, the instruction including an indicator and the executing the instruction including:

performing a plurality of operations of the instruction to generate a hash-based message authentication code;

detecting, based on performing the plurality of operations, an access exception condition for a storage location used by an instrumentation counter, the instrumentation counter to be accessed by the instruction and configured to be updated based on performing the hash-based message authentication code processing;

setting the indicator to a selected value based on detecting the access exception condition; and interrupting execution of the instruction indicating incomplete processing, based on detecting the access exception condition; and re-executing the instruction to obtain access to the instrumentation counter, the re-executing the instruction starting from where execution was interrupted as indicated by the indicator set to the selected value and including updating the instrumentation counter.

25. A computer-implemented method comprising:

executing an instruction to perform hash-based message authentication code processing, the instruction including an indicator and the executing the instruction including:

performing a plurality of operations of the instruction to generate a hash-based message authentication code;

detecting, based on performing the plurality of operations, an access exception condition for a storage location used by an instrumentation counter, the instrumentation counter to be accessed by the instruction and configured to be updated based on performing the hash-based message authentication code processing;

setting the indicator to a selected value based on detecting the access exception condition; and interrupting execution of the instruction indicating incomplete processing, based on detecting the access exception condition; and re-executing the instruction to obtain access to the instrumentation counter, the re-executing the instruction starting from where execution was interrupted as indicated by the indicator set to the selected value and including updating the instrumentation counter.

* * * * *